(12) United States Patent
Wimmer

(10) Patent No.: US 11,579,371 B2
(45) Date of Patent: Feb. 14, 2023

(54) FIBER OPTIC CONNECTOR HAVING A COMPRESSIBLE BODY AND COMPLIMENTARY RECEPTACLE ALONG WITH METHODS OF MAKING

(71) Applicant: Corning Optical Communications LLC, Charlotte, NC (US)

(72) Inventor: Michael Wimmer, Berlin (DE)

(73) Assignee: Corning Optical Communications LLC, Charlotte, NC (US)

( * ) Notice: Subject to any disclaimer, the term of this patent is extended or adjusted under 35 U.S.C. 154(b) by 109 days.

(21) Appl. No.: 17/029,700

(22) Filed: Sep. 23, 2020

(65) Prior Publication Data

US 2021/0003788 A1 Jan. 7, 2021

Related U.S. Application Data

(63) Continuation-in-part of application No. PCT/US2018/035395, filed on May 31, 2018.

(51) Int. Cl.
*G02B 6/36* (2006.01)
*G02B 6/38* (2006.01)

(52) U.S. Cl.
CPC ......... *G02B 6/3807* (2013.01); *G02B 6/3825* (2013.01); *G02B 6/3893* (2013.01); *G02B 6/38875* (2021.05)

(58) Field of Classification Search
CPC .. G02B 6/3825; G02B 6/3887; G02B 6/3893; G02B 6/36
See application file for complete search history.

(56) References Cited

U.S. PATENT DOCUMENTS

| | | | |
|---|---|---|---|
| 5,887,100 A | 3/1999 | Robertson | |
| 2010/0098381 A1* | 4/2010 | Larson | G02B 6/3846 385/60 |
| 2010/0247039 A1 | 9/2010 | Ohtsuka et al. | |
| 2012/0219253 A1 | 8/2012 | Arishima et al. | |
| 2016/0349460 A1* | 12/2016 | Collier | G02B 6/3849 |

FOREIGN PATENT DOCUMENTS

| | | |
|---|---|---|
| CN | 203348816 U | 12/2013 |
| EP | 2378176 A1 | 10/2011 |
| WO | 2012/125836 A2 | 9/2012 |

OTHER PUBLICATIONS

International Search Report and Written Opinion of the International Searching Authority; PCT/US2018/035395; dated Feb. 25, 2019; 11 Pages; European Patent Office.
Max-Planck-Gesellschaft, "Actuators that mimic ice plants", available online at <https://www.mpg.de/9305686/actuator>, Jun. 29, 2015, 4 pages.

* cited by examiner

*Primary Examiner* — Jennifer Doan
(74) *Attorney, Agent, or Firm* — Michael E. Carroll, Jr.

(57) ABSTRACT

A fiber optic connector comprising a connector body that can receive the optical cable and a complimentary receptacle. Fiber optic connector comprises a ferrule body having a passageway to guide an optical fiber of the optical cable, and a compress body being arranged between the connector body and the ferrule body. The compress body has a hollow area to receive the optical fiber. The compress body is configured to exert a force to the ferrule body so that the end face of the ferrule body is moved in a forward direction away from the connector body, when an external force is applied to an outer surface of the compress body. Methods of making assemblies are also disclosed.

20 Claims, 15 Drawing Sheets

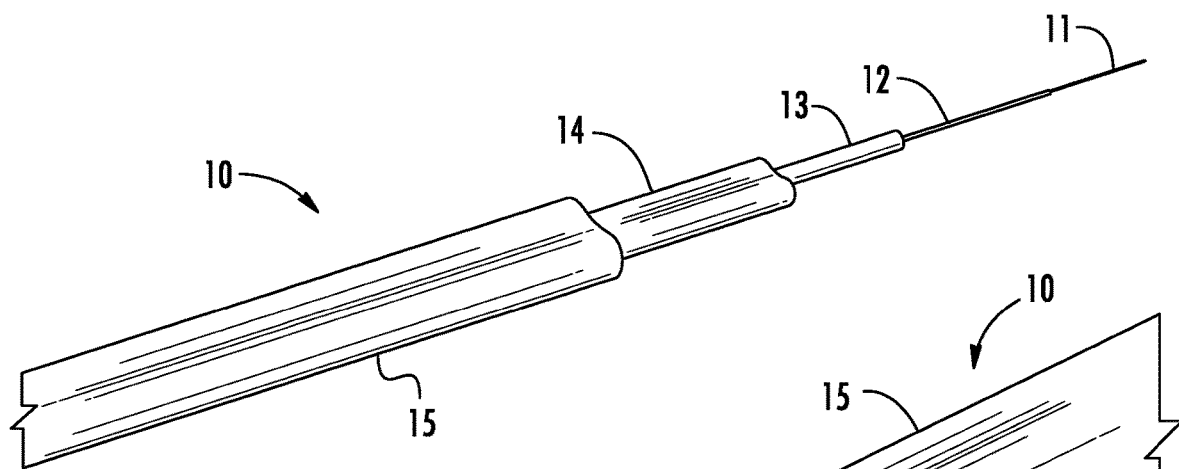
FIG. 1A
FIG. 1B
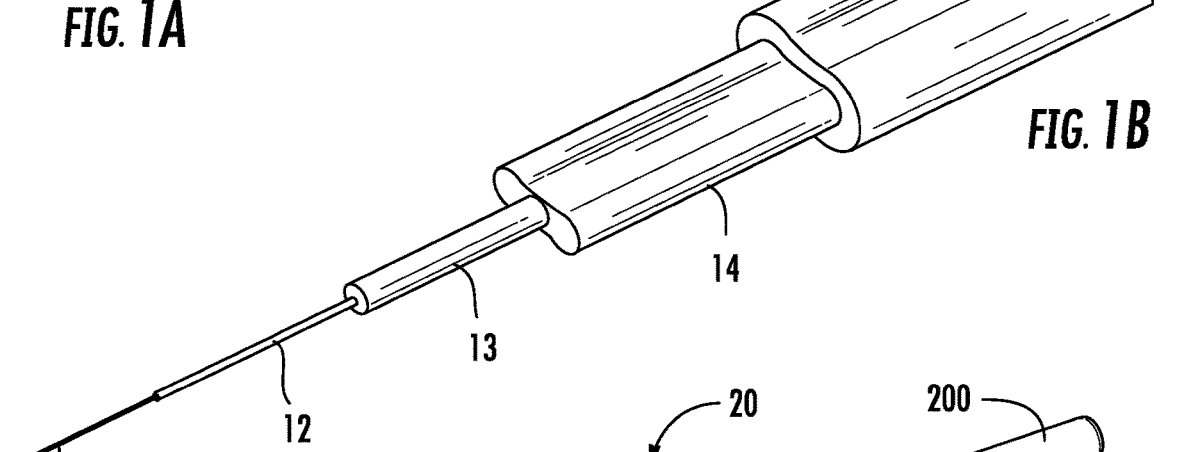
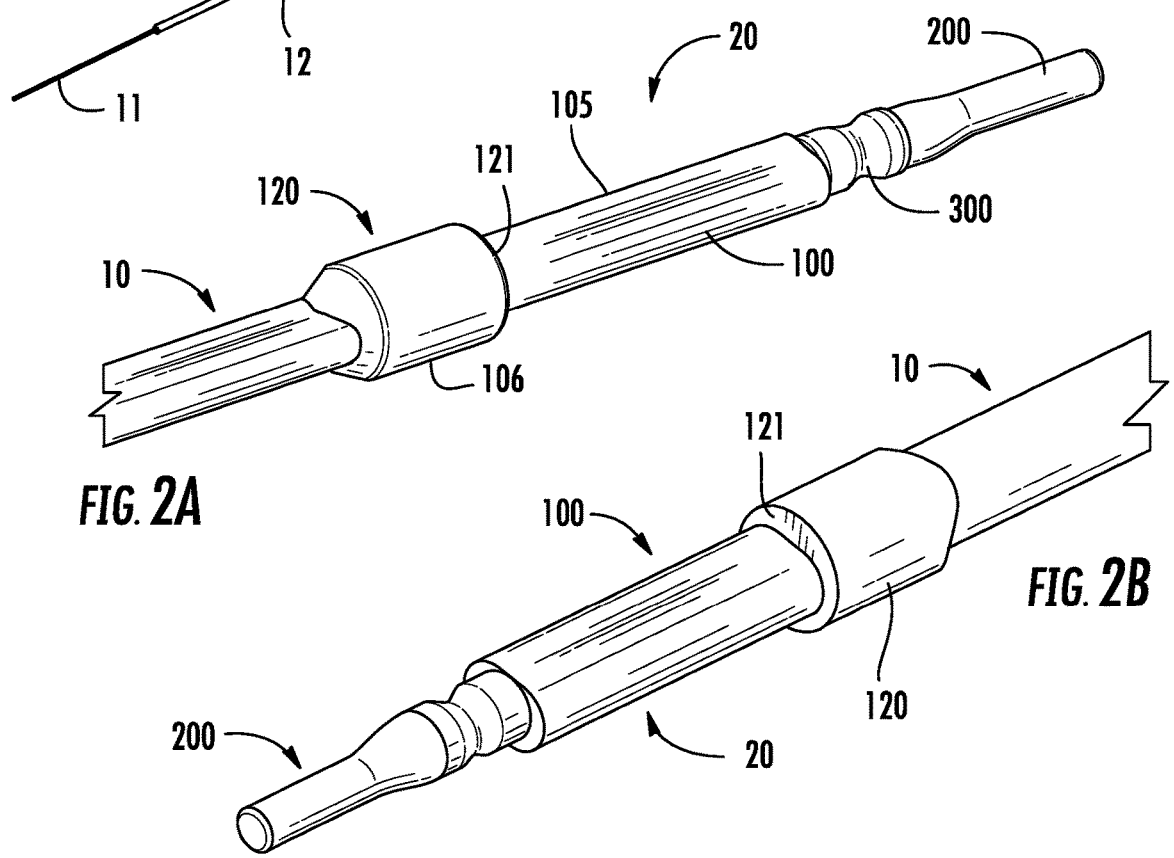
FIG. 2A
FIG. 2B

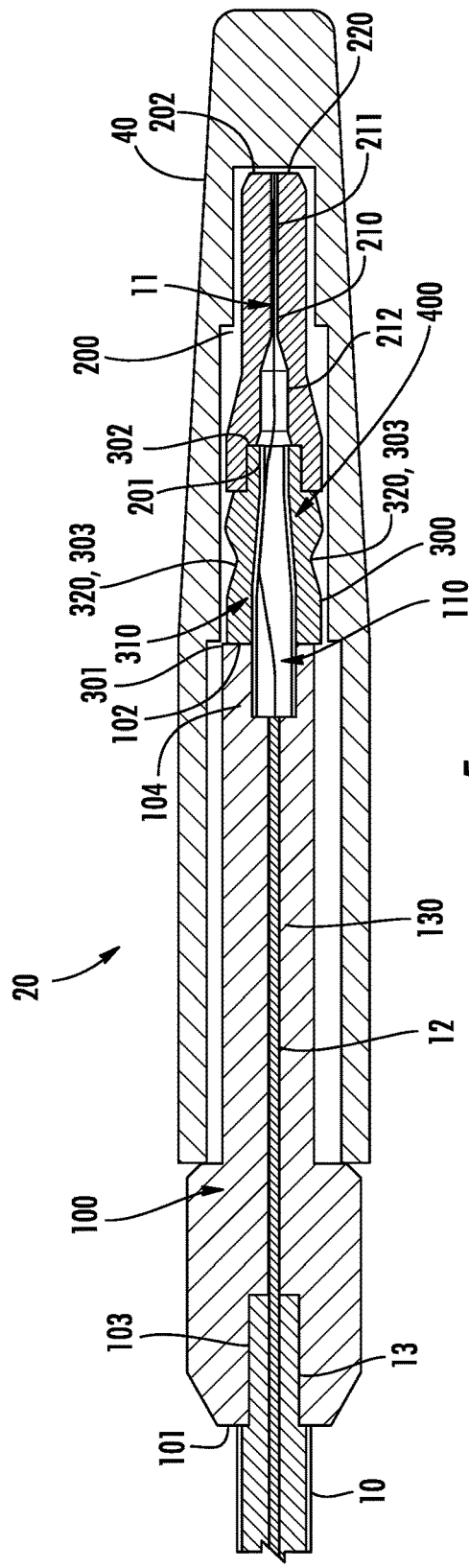

FIBER OPTIC CONNECTOR HAVING A COMPRESSIBLE BODY AND COMPLIMENTARY RECEPTACLE ALONG WITH METHODS OF MAKING

RELATED APPLICATIONS

This application claims the benefit of priority under 35 U.S.C. § 365 of International Patent Application Serial No. PCT/US2018/035395 filed on May 31, 2018, designating the United States of America the content of which is relied upon and incorporated herein by reference in its entirety.

TECHNICAL FIELD

The disclosure relates to a fiber optic connector for connectorization of an optical cable, for example a ruggedized optical cable (ROC). The disclosure further relates to a receptacle to receive the fiber optic connector, for example an inline adaptor or an optical port for wall throughputs.

BACKGROUND

Communication networks are used to transport a variety of signals such as voice, video, data transmission and the like. Traditional communication networks use copper wires in cables for transporting information and data. However, copper cables have drawbacks because they are large, heavy, and can only transmit a relatively limited amount of data. On the other hand, an optical waveguide is capable of transmitting signals having an extremely large amount of bandwidth compared with a copper conductor. Moreover, an optical cable is much lighter and smaller compared with a copper cable having the same bandwidth capacity.

Consequently, optical cables replaced most of the copper cables in long-haul communication network links, thereby providing greater bandwidth capacity for long-haul links. As optical waveguides are deployed deeper in communication networks, subscribers will have access to increased bandwidth. But there are certain obstacles that make it challenging and/or expensive to route optical waveguides/optical cables deeper into the communication network, i.e. closer to the subscriber.

For instance, making a suitable optical connection between optical waveguides is much more difficult than making an electrical connection between copper wires. Additionally, as the communication network pushes towards subscribers, the communication network requires more connections, which compounds the difficulties of providing optical waveguides to the premises of the subscriber.

A common way to connect optical fibers of an optical cable is by using optical connectors. Fiber optic connectors generally hold the mating optical fibers/waveguides in respective ferrules of the mating connectors. The process of terminating individual optical fibers from an optical cable by an optical connector is referred to as "connectorization" or "termination" of the optical fibers with a connector.

Installing fiber optic connectors is best performed in a factory setting under ideal working conditions. However, it is often necessary that optical fibers of optical cables have to be coupled by means of optical connectors in the field where there is no, or less, specialized equipment available. Terminating an optical cable with a connector may become particularly complex depending on the construction of the optical cable and the strain relief performance required.

There is an unresolved need to provide a fiber optic connector for connectorization of an optical cable, wherein the fiber optic connector has a small size, and the manufacturing processes of the fiber optic connector and the installation process in the field is simplified. There is a further desire to provide a receptacle to receive the fiber optic connector, wherein the receptacle has a small size and allows optical cables to be connected in the field with an easy process.

SUMMARY

According to an embodiment of a fiber optic connector comprising a connector body having a first end to receive the optical cable and a second end. The fiber optic connector comprises a ferrule body having a passageway to guide an optical fiber of the optical cable. The passageway extends from a first end of the ferrule body to a second end of the ferrule body, the second end of the ferrule body having an end face for terminating an end face of the optical fiber.

The fiber optic connector further comprises a compress body being arranged between the second end of the connector body and the first end of the ferrule body. The compress body has a hollow area to receive the optical fiber. The compress body is configured to exert a force to the ferrule body so that the end face of the ferrule body is moved in a forward direction away from the connector body, when an external force is applied to an outer surface of the compress body.

In order to optically couple an optical fiber of a first connectorized optical cable to an optical fiber of a second connectorized optical cable, it is necessary to bring the ferrule body of a first fiber optic connector that terminates the first optical cable and a ferrule body of a second fiber optic connector that terminates the second optical cable in a mating position. For this purpose a respective end face of the ferrule body of the first fiber optic connector has to be pressed against the end face of the ferrule body of the second fiber optic connector.

Conventional fiber optic connectors usually use a spring to apply ferrule end face compression and thus fiber end face compression. In the mated state of conventional fiber optic connectors, the respective optical fiber of the first and the second optical cable are buckled inside the respective fiber optic connector. Therefore, additional buckling space has to be provided in a conventional fiber optic connector using spring elements to apply ferrule/fiber end face compression.

According to the proposed fiber optic connector solution a ferrule/fiber end face compression is provided by applying the external force to the outer surface of the compress body of the fiber optic connector. The external force may be provided by an engagement element of a receptacle to receive the fiber optic connector. Basically, the ferrule/fiber end face compression is applied by a combination of the fiber optic connector and the receptacle. Under ideal conditions, for example without any tolerances between the fiber optic connectors to be coupled, it would be sufficient to place the ends of the respective ferrule bodies of the fiber optic connectors to each other and apply the compression force from the outside in a static mating condition to achieve a physical optical connection between the optical fibers.

However, due to tolerances in the system, a fiber length compensating condition is required. Therefore, the fiber optic connector uses a (pre-)buckled fiber principle that creates a fiber buckling within the fiber optic connector with possible macrobends before the mating condition. In the mated condition, the buckling is reduced to a minimum and macrobends can be avoided. Basically, optical losses can occur during bending the fiber which lead to loss in optical performance. In the present design of the application the fiber bending is reduced to a minimum and avoid optical losses during optical signal distribution in the mated state of optical connectors. The present design can have a smaller buckling cavity in the fiber optic connector than a conventional fiber optic connector, because the optical fiber is in the most buckled state inside the buckling cavity of fiber optic connector in the unmated state of the fiber optic connector, i.e. when no optical signal distribution occurs. In the unmated state of the fiber optic connector, the optical fiber is mechanically more reliable and can be bended much tighter, because the impact to the optical performance is not available in the unmated state of the fiber optic connector. The buckling cavity may be configured as a hollow area inside of the fiber optic connector. The (pre-) buckled fiber principle in combination with the ferrule/fiber end face compression in static conditions allow to reduce the size of the fiber optic connectors.

The limitation of bringing the end faces of the ferrule bodies of the fiber optic connectors in the mating position and applying the compression force require a compression source from outside of the connector, for example from a receptacle to receive the fiber optic connector. An embodiment of a receptacle to receive the fiber optic connector and having an element to provide the external force to the compress body of the fiber optic connector.

According to a one embodiment of a receptacle for receiving the fiber optic connector disclosed herein, the receptacle comprises a securing body to secure the fiber optic connector to the receptacle. The securing body comprises at least an engagement element to engage to the compress body of the fiber optic connector to secure the fiber optic connector to the receptacle. The at least one engagement element is configured to provide the external force to the outer surface of the compress body of the fiber optic connector so that the end face of the ferrule body of the fiber optic connector is moved in the forward direction away from the connector body of the fiber optic connector.

The concepts disclosed for the fiber optic connector may be configured as a hardened fiber optic connector for outdoor or indoor/outdoor applications.

The fiber optic connector may be embodied as a connector with a balanced ferrule compression mechanism. The fiber optic connector eliminates the disadvantages of conventional fiber optic connectors using spring-loaded ferrules which apply compression only under fiber length changes. The present design of the fiber optic connector also apply compression under fiber length changes. However, the difference is that the fiber bending is reduced in the mated state of the fiber optic connector, i.e. during operation, when optical signal distribution occurs, whereas the bending of the optical fiber is increased in the mated state of the conventional fiber optic connector using spring loaded ferrules. According to the fiber optic connector, the ferrule/fiber end face compression is applied from the interference from the receptacle/adaptor and connector, wherein no fiber length changes are required.

To compensate length tolerances, a (pre-)buckled optical fiber is arranged inside the fiber optic connector which allows the reduction of buckling space and thus allows a smaller connector size. Moreover, the new design of the fiber optic connector allows to bend the optical fiber in the buckling space/cavity of the fiber optic connector with smaller radii in the unmated state, because no optical signal distribution and thus no optical losses occur in the unmated state of the fiber optic connector. The optical fiber can see more stress before the mechanical effects, for example breaking, occurs.

A conventional fiber optic connector using a spring-loaded ferrule needs a bigger connector design to hold the ferrule in place. In particular, the spring element of a conventional fiber optic connector needs to be fixed to the housing of the connector. The spring element is usually held in place by a ferrule holder which needs to engage with the housing. Otherwise, the parts would be loose and fall out. If optical cables attached to a respective conventional fiber optic connector using spring-loaded ferrules are pulled, the compression force is reduced in the spring-loaded ferrules. According to the present design of the fiber optic connector, due to the interference shape between receptacle and connector, cable load condition can be compensated. It is possible to increase the compression on the fiber end face in a certain range, if the optical cable is pulled. This counter-reaction provides a higher reliability.

The present design for the fiber optic connector allows a fast installation in the field due to the used push-in principle. Manual effort has to be applied only for removing the plug. The variation complexity is reduced by allowing to attach different cable types to the fiber optic connector. Moreover, the fiber optic connector may be designed for connectorizing optical cables having a single optical fiber and multiple fibers.

Additional features and advantages are set forth in the detailed description that follows, and in part will be readily apparent to those skilled in the art from the description or recognized by practicing the embodiments as described in the written description and claims hereof, as well as the appended drawings. It is to be understood that both the foregoing general description and the following detailed description are merely exemplary and are intended to provide an overview or framework to understand the nature and character of the claims.

BRIEF DESCRIPTION OF THE DRAWINGS

FIGS. 1A and 1B show an optical cable which may be used as an FTTH (Fiber To The Home) cable in a non-connectorized condition.

FIGS. 2A and 2B show two perspective views of an embodiment of a fiber optic connector comprising a connector body, a compress body and a ferrule body.

FIG. 5 shows a cross-section of an embodiment of a fiber optic connector with a dust cap in a lateral view.

FIG. 6 illustrates a cross-section of an embodiment of a fiber optic connector with a dust cap from a top view.

DETAILED DESCRIPTION

Figure 3A:
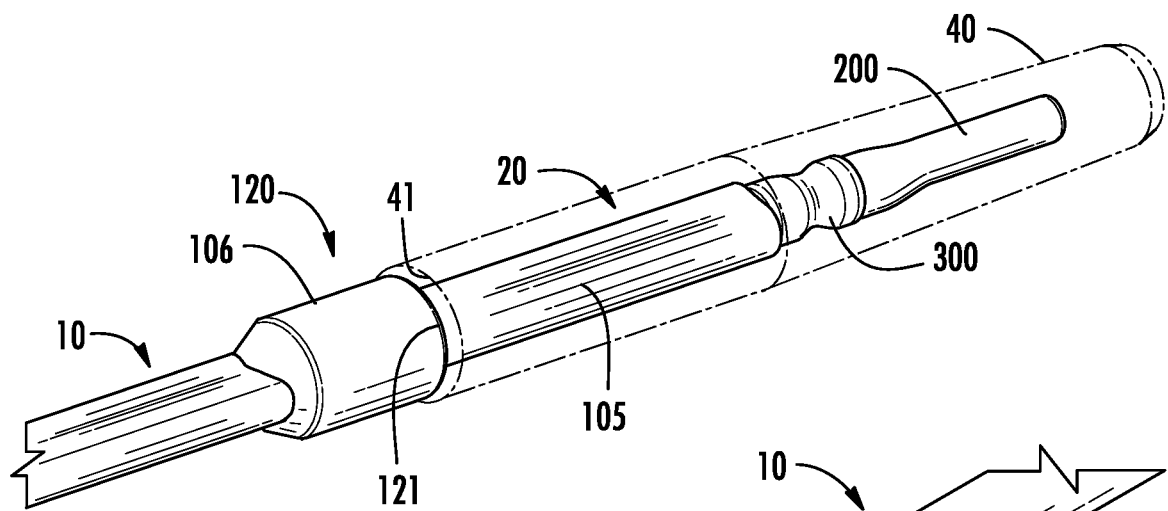
FIGS. 3A and 3B show two perspective views of an embodiment of a fiber optic connector with a dust cap for protecting a ferrule body of the fiber optic connector.

Embodiments of a fiber optic connector and a receptacle are now be described more fully hereinafter with reference to the accompanying drawings. The embodiments of the fiber optic connector and the receptacle may, however, be embodied in many different forms and should not be construed as limited to the embodiments set forth herein; rather, these embodiments are provided so that the disclosure will fully convey the scope of the embodiments of the fiber optic connector and the receptacle to those skilled in the art. The drawing are configured to clearly illustrate the different embodiments of the fiber optic connector and the receptacle.

FIGS. 1A and 1B show an embodiment of an optical cable 10 that may be used as an FTTH (Fiber To The Home) cable. The cable may be configured as a ROC (Ruggedized Optical Cable) drop or ST drop cable available from Corning Optical Communications, LLC of Hickory, N.C., but other cable types are possible with the concepts disclosed. The optical cable 10 comprises an optical fiber 11 representing a fiber core of the cable. The optical fiber 11 comprises a light-transmitting core being surrounded by a cladding. The optical fiber 11 may have a nominal cladding diameter of 125 µm, but other diameters are possible. The optical fiber 11 is surrounded by one or more coatings to protect the cladding. The coated optical fiber is referenced by the reference sign 12 and may have a suitable diameter such as 250 µm, but other diameters are possible. The reference sign 13 makes reference to the tight buffered optical fiber, i.e. the coated optical fiber 12 is surrounded by a tight buffer. The tight buffered optical fiber 13 may have an upcoated diameter of 900 µm, and other dimensions are possible as well. The cable 10 further comprises strength elements 14 which may be configured, for example, as GRP (Glass Reinforced Plastic) elements. The tight buffered optical fiber 13 is arranged between the strength elements 14. The arrangement of the tight buffered optical fiber 13 and the strength elements 14 is surrounded by a jacket 15 which may be configured as an overmolded plastic jacket. FIGS. 1A and 1B show the non-connectorized condition of the optical cable 10.

FIGS. 2A and 2B show an embodiment of a fiber optic connector 20. The fiber optic connector 20 may be configured as a hardened fiber optic connector. The fiber optic connector 20 comprises a connector body 100 to receive the optical cable 10. The fiber optic connector 20 further comprises a ferrule body 200 to guide an optical fiber of the optical cable 10. Moreover, the fiber optic connector 20 comprises a compress body 300 being arranged between the connector body 100 and the ferrule body 200.

Figure 3B:
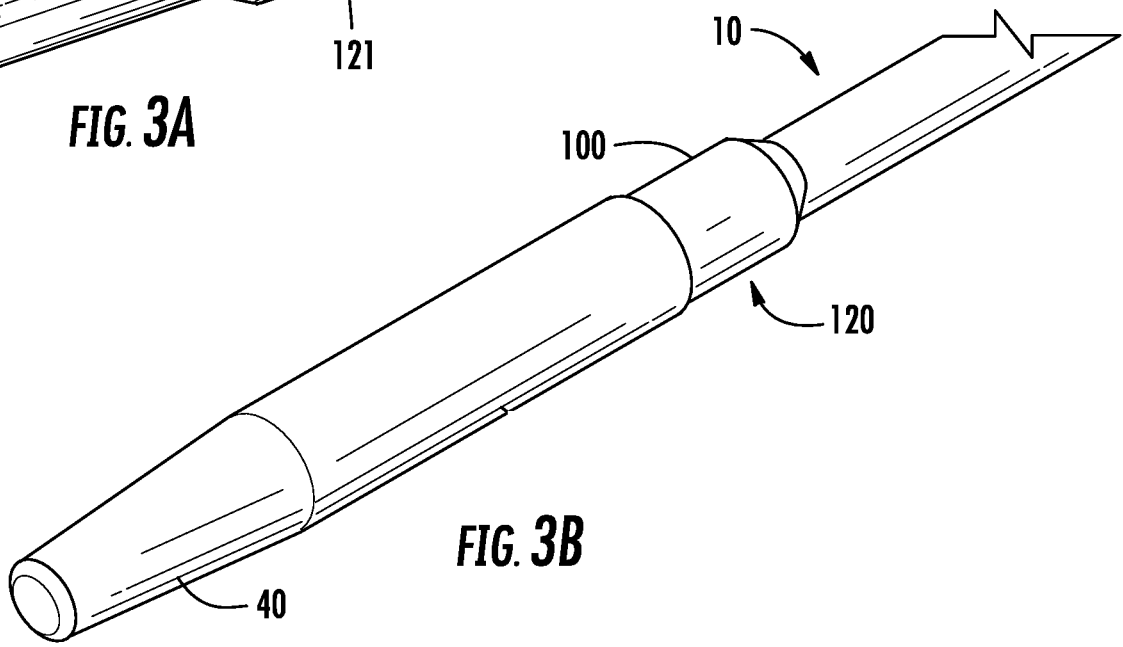

FIGS. 3A and 3B show an embodiment of the fiber optic connector 20, as shown in FIGS. 2A and 2B, with a dust cap 40 being slid over the ferrule body 200, the compress body 300 and a front portion 105 of the connector body 100. A rear portion 106 of the connector body 100 is configured as a cylindrically-shaped portion 120 having a larger diameter than the front portion 105. The cylindrically-shaped portion 120 is formed as a thickening in comparison to the front portion 105 of the connector body 100 so that a front end face 121 of the thickening portion 120 provides an abutment for the dust cap 40. When the dust cap 40 is pushed on the fiber optic connector 20 an end face 41 of the dust cap abuts on the end face 121 of the thickening portion 120 of the connector body 100. The thickening portion is a jacket overmold and support with sealing. Furthermore, it helps with handling of plugging and unplugging. It provides a shape and size to grab to, if it need to be pushed out of a port.

Figure 4:
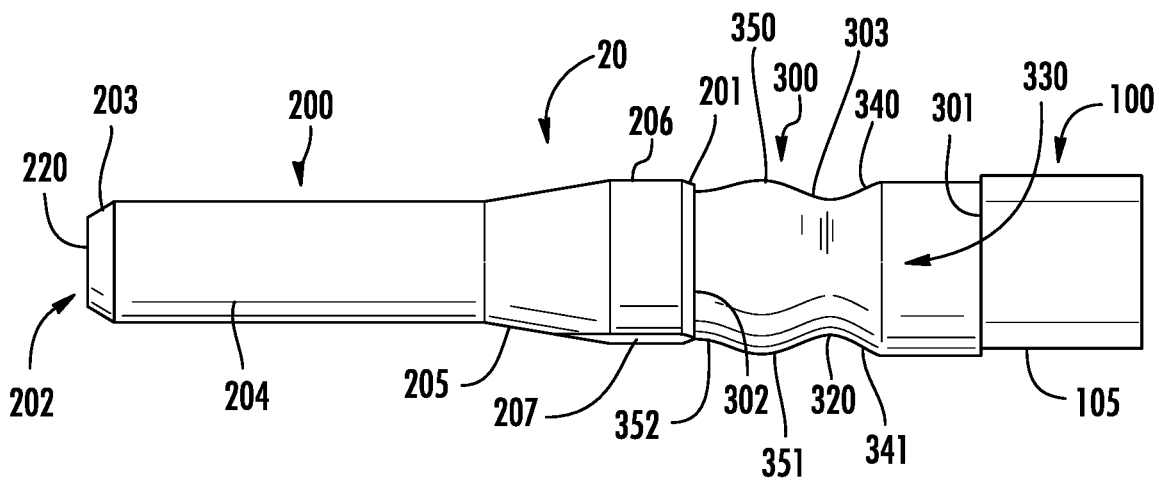
FIG. 4 illustrates a side view of a fiber optic connector comprising a ferrule body, a compress body and a connector body.

FIG. 4 shows a side view of a portion of the fiber optic connector 20. In particular, FIG. 4 shows the ferrule body 200, the compress body 300 and a part of the front portion 105 of the connector body 100. The ferrule body 200 has an end face 220 at which an optical fiber that is guided within the ferrule body 200 terminates. The ferrule body 200 has a slanted front portion 203 proximal to an end 202 of the ferrule body 200. The ferrule body 200 further comprises a cylindrically-shaped portion 204 and a cylindrically-shaped portion 206 being proximal to an end 201 of the ferrule body 200. The ferrule body 200 has a conically-shaped portion 205 forming a transition between the cylindrically-shaped portion 204 and the cylindrically-shaped portion 206 of the ferrule body 200. The cylindrically-shaped portion 206 and a part of the conically-shaped transition portion 205 may have a flattened surface 207. The flattened surface 207 provides an alignment feature to allow the insertion of the fiber optic connector 20 in a receptacle in the right orientation.

According to a possible embodiment the conically-shaped portion 205 and the cylindrically shaped portion 206 may be embodied as an overmolded ferrule holder of the ferrule body 200.

The compress body 300 has an end 301 being proximal to the connector body 100 and an end 302 being proximal to the ferrule body 200. The compress body 300 comprises a cylindrically-shaped portion 330 and a notch 320. The cylindrically-shaped portion 330 has a larger diameter than the notch 320 at its bottom surface. The compress body 300 has a smooth transition portion 340 between the cylindrically-shaped portion 330 and the notch 320. The transition portion 340 has a slanted surface 341 to enable a smooth transition from the cylindrically-shaped portion 330 to the notch 320. The compress body 300 further comprises a front portion 350. The front portion 350 is formed such that the diameter of the front portion 350 increases from the bottom of the notch 320 at a section 351 of the front portion 350 and then decreases again at a portion 352 of the front portion 350 of the compress body.

FIG. 5 shows a cross-sectional view of the fiber optic connector 20 for connectorization of the optical cable 10 in a side view. FIG. 6 shows a slightly modified embodiment of the fiber optic connector 20 from a top view. In particular, according to the embodiment shown in FIG. 5, the optical cable is fixed to the fiber optic connector, wherein the jacket material between the strength elements is removed. According to the embodiment shown in FIG. 6, the optical cable is fixed to the fiber optic connector, wherein the jacket material between the strength elements is not removed. The configuration shown in FIG. 5 allows to increase the buckling cavity. On the other hand, using the configuration shown in FIG. 6 would allow for easier stripping of the cable jacket without removing the jacket material between the strength elements.

Regarding FIG. 5, the front portion of the fiber optic connector 20 comprising the ferrule body 200, the compress body 300 and the front portion 105 of the connector body 100 are housed by a dust cap 40. The connector body 100 is configured to receive the optical cable 10 at the first end 101. The second end 102 of the connector body 100 abuts on the compress body 300. The ferrule body 200 has a passageway 210 to guide the optical fiber 11 of the optical cable 10. The optical fiber 11 comprises the light-transmitting core and a cladding which surrounds the light-transmitting core. The optical fiber 11 may have a diameter of 125 μm. The passageway 210 of the ferrule body 200 extends from the first end 201 of the ferrule body 200 to the second end 202 of the ferrule body. The optical fiber 11 terminates at an end face 220 of the ferrule body.

The compress body 300 is arranged between the end 102 of the connector body 100 and the end 201 of the ferrule body 200. The compress body 300 has a hollow area 310 to receive the optical fiber 11. The compress body 300 is configured to exert a force on the ferrule body 200 so that the ferrule body and, in particular, the end face 220 of the ferrule body 200 is moved in a forward direction away from the connector body 100, when an external force is applied to an outer surface 303 of the compress body 300. In particular, the compress body 300 is configured so that the ferrule body 200 is moved in the forward direction, when the external force is applied to the notch 320 of the compress body 300, as illustrated in FIG. 12B.

The external force may be applied by a clamping element of a receptacle in which the fiber optic connector 20 has to be inserted to be coupled to another fiber optic connector. The compress body 300 enables that the end face 220 of the ferrule body 200 is moved forward and pressed against an end face of a ferrule body of the other fiber optic connector that is inserted in a receptacle from the opposite direction. The ferrule/fiber end face compression mechanism is explained below in detail with reference to FIG. 12B.

The compress body 300 is configured as an elastic body being arranged between the connector body 100 and the ferrule body 200. The compressible structure of the compress body 300 can be realized by using a compressible or incompressible material for the compress body 300 to transfer a side compression generated by an external force into an axial direction to the ferrule body 200, as illustrated in FIG. 12B. An incompressible material has some advantages due to the control of the fix constellation between volume vs. stress. The material of the compress body 300 is able to keep the compression in a specified range to allow a constant ferrule/end face compression. A silicon gel, for example, can be used as an appropriate material for the compress body 300 which offers elastic incompressible properties for temperatures from −40° C. up to +120° C.

According to another possible embodiment, the compress body 300 may be realized by using a material having a honeycombed cellular structure. The walls of the cells of such material may be made of a non-swellable polymer, and a swellable polymer may fill the interior of the chambers. If the pressure inside the cells increases, for example, by an impact of an external force, the material structure may expand in one direction. When such a compressible material structure is used for the compress body 300, the material of the compress body 300 may expand in the direction towards the ferrule body 200, if an external force impacts on the outer surface 303 of the compress body 300, for example on the notch 320 of the compress body. The cells of the material may have an eight-sided shape, in particular a sort of two rectangles whose two halves are juxtaposed to form a step-like structure.

As shown in FIGS. 5 and 6, the hollow area 310 of the compress body 300 extends in a longitudinal direction of the fiber optic connector 10 from an end 301 of the compress body 300 proximal to the connector body 100 and distal to the ferrule body 200 to an end 302 of the compress body 300 distal to the connector body 100 and proximal to the ferrule body 200. The hollow area 310 of the compress body has a diameter so that, in a connectorized state of the fiber optic connector 20 in which the fiber optic connector is connected to the optical cable 10, the optical fiber 11 is arranged in a buckled shape in the hollow area 310 of the compress body 300, at least when the external force is not applied to the outer surface 303 of the compress body 300.

The connector body 100 has an end section 104 being proximal to the end 102 of the connector body 100 and distal to the end 101 of the connector body. The end section 104 of the connector body 100 has a hollow space 110. In the connectorized state of the fiber optic connector in which the fiber optic connector 20 is connected to the optical cable 10, the optical fiber 11 is arranged in the buckled shape in the hollow space 110 of the connector body 100, at least when the external force is not applied to the outer surface 303 of the compress body 300. The connector body 100 has an end section 103 being proximal to the end 101 of the connector body and distal to the end 102 of the connector body. The end section 103 of the connector body 100 is configured to receive the tight-buffered optical fiber 13. The tight buffered optical fiber 13 may have a diameter of 900 μm.

FIG. 6 shows the strength elements 13 being fixed, for example molded/glued, to the connector body 100. The strength elements 13 are attached to the connector body 100 for transferring the mechanical loads. The connector body 100 comprises a channel 130 between the end sections 103 and 104. The channel 130 is configured to receive the coated optical fiber 12 comprising the light-transmitting core, the cladding and the coating of the optical fiber. The coated optical fiber 12 may have a diameter of 250 μm.

The passageway 210 of the ferrule body 200 has a first portion 211 being proximal to the end 202 of the ferrule body and distal to the end 201 of the ferrule body, and a second portion 212 being proximal to the end 201 of the ferrule body and distal to the end 202 of the ferrule body. The second portion 212 of the passageway 210 of the ferrule body 200 has a larger diameter than the first portion 211 of the passageway 210 of the ferrule body 200. In the connectorized state of the fiber optic connector 20 in which the fiber optic connector 20 is connected to the optical cable 10, the optical fiber 11 is arranged in the buckled shape in the second portion 212 of the passageway 210 of the ferrule body, at least when the external force is not applied to the outer surface 303 of the compress body 300.

As shown in FIGS. 5 and 6, the fiber optic connector 20 may comprise a support tube 400 to guide the optical fiber 11. The support tube 400 is arranged at least in the hollow area 310 of the compress body 300. In the connectorized state of the fiber optic connector 20 in which the fiber optic connector 20 is connected to the optical cable 10, the optical fiber 11 is arranged in the buckled shape in the support tube 400, at least when the external force is not applied to the outer surface 303 of the compress body 300.

The support tube 400 comprises a first section 401 being arranged in the second portion 212 of the passageway 210 of the ferrule body 200. A second section 402 of the support tube 400 is arranged in the hollow area 310 of the compress body 300. A third section 403 of the support tube 400 is arranged in the end section 104 of the connector body 100. As illustrated in FIGS. 5 and 6, in the connectorized state of the fiber optic connector 20 in which the fiber optic connector 20 is coupled to the optical cable 10, the optical fiber 11 is arranged in the buckled shape at least in the second section 402 of the support tube 400. In the connectorized state of the fiber optic connector 20, the optical fiber 11 may optionally be arranged in the buckled shape also in the first section 401 and in the third section 403 of the support tube 400.

The support tube 400 is configured as a stiff ferrule support element which enables the ferrule body 200 to be kept in position and avoid fiber breaks during plugging. The optical fiber 11 is shown in FIGS. 5 and 6 in the (pre-)buckled/buckled state inside the support tube 400, when the fiber optic connector 20 is in the unmated condition in which the fiber optic connector 20 is not inserted in a receptacle and thus is not connected to another fiber optic connector. In the unmated state of the fiber optic connector 20, the ferrule body 200 and the compress body 300 are in the uncompressed state.

Figure 7A:
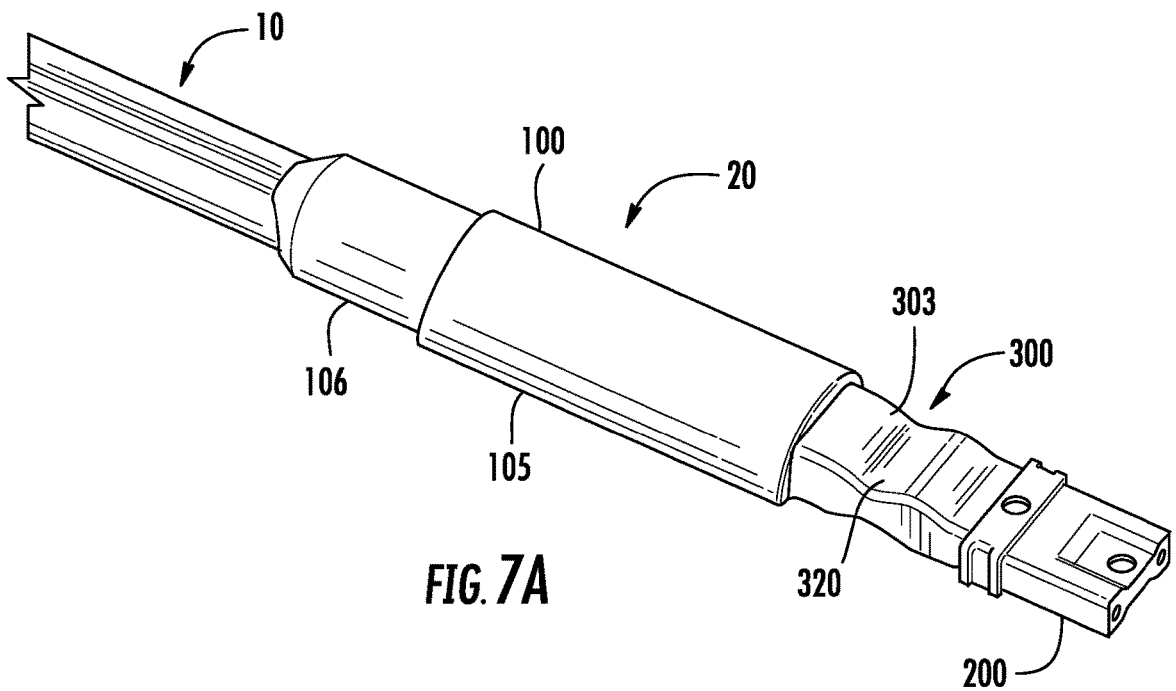
FIGS. 7A and 7B show a fiber optic connector design for terminating an optical cable having multiple optical fibers.
Figure 7B:
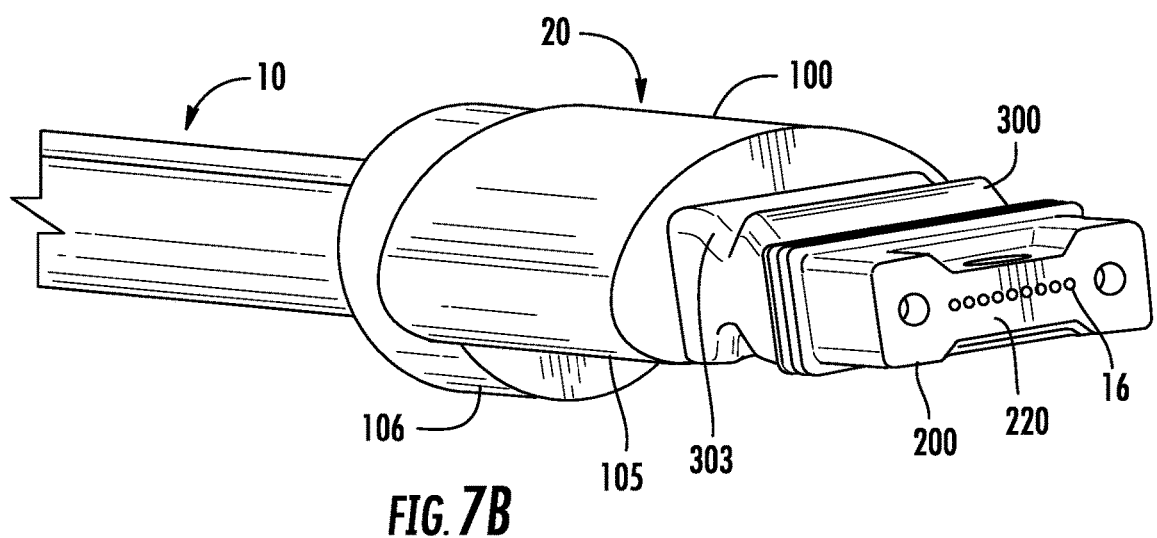

FIGS. 7A and 7B show two perspectives of an embodiment of a fiber optic connector 20 for connectorization of an optical cable 10 having multiple optical fibers 16. The fiber optic connector 20 comprises the connector body 100 with the front portion 105 and the rear portion 106. The fiber optic connector further comprises the ferrule body 200 to receive the multiple optical fibers 16. The ferrule body 200 may be configured as an MTP ferrule. The fiber optic connector comprises the compress body 300 with the notch 320. The compress body 300 is configured to exert a force on the ferrule body 200 so that the end face 220 of the ferrule body 200 is moved in a forward direction away from the connector body 100, when an external force is applied to the outer surface 303 of the compress body 300. In particular the external force may impact on the notch 320 of the compress body 300.

Figure 8A:
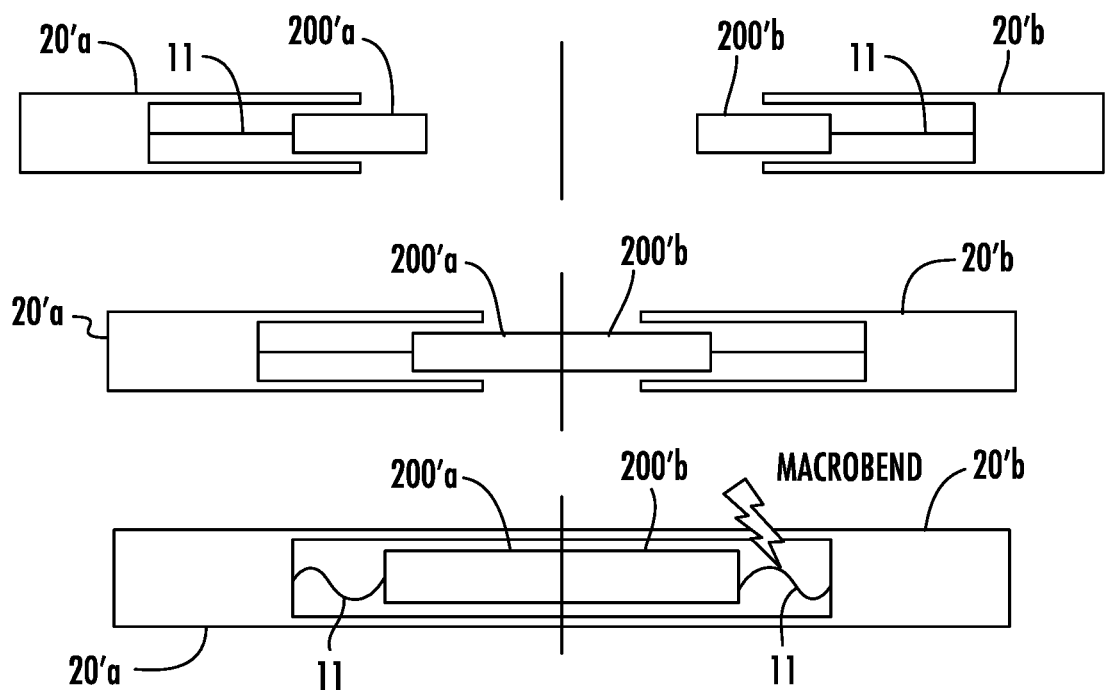
FIGS. 8A and 8B illustrate a comparison of two optical connection principles.
Figure 8B:
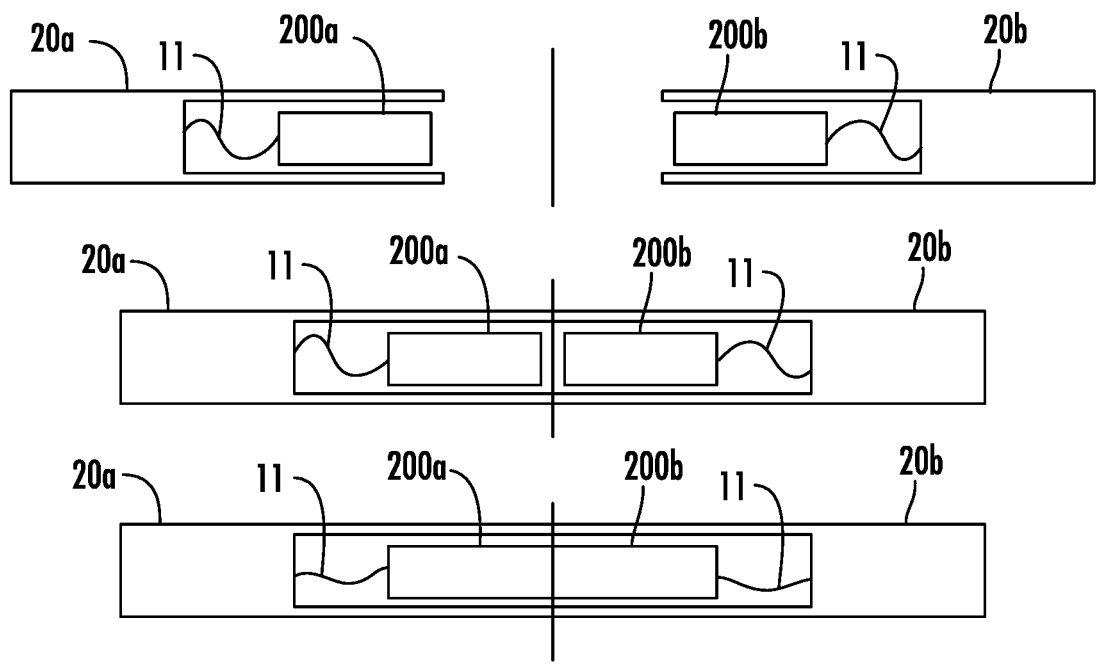

FIGS. 8A and 8B illustrate a comparison of two optical connection principles to indicate the behavior of the parameters "ferrule compression" versus "fiber lengths". FIG. 8A illustrates an optical connection principle using spring-loaded ferrules 200'a, 200'b, whereas FIG. 8B shows an optical connection principle using external ferrule/fiber end face compression.

FIG. 8A shows, in the upper drawing, fiber optic connectors 20'a, 20'b in the unmated condition. The fiber optic connectors 20'a, 20'b respectively comprise a ferrule body 200'a, 200'b which terminates a respective optical fiber 11. The fiber optic connectors 20'a, 20'b are shown in the upper drawing of FIG. 8A in the unmated condition. The optical fibers 11 are arranged inside the fiber optic connectors 20'a, 20'b in a straight manner in the unmated condition of the fiber optic connectors 20'a, 20'b. FIG. 8A shows a first contact of the ferrule bodies 200'a, 200'b in the middle drawing. The bottom drawing of FIG. 8A shows the fiber optic connectors 20'a, 20'b in an optically coupled state of the ferrule bodies 200'a, 200'b.

According to the embodiment of the fiber optic connection of FIG. 8A, the fiber optic connectors 20'a, 20'b use a spring, not shown in FIG. 8A, to apply fiber end face compression. Due to the linear spring behavior it is necessary to buckle the optical fibers 11 inside the fiber optic connectors 20'a, 20'b to apply the compression force. A disadvantage is that buckling of the optical fibers 11 is necessary in the optically coupled state. The buckling of the optical fibers 11 may cause optical attenuation due to macro-bending effects in the optically coupled state. Furthermore, the buckling requires additional buckling space resulting in a large connector size. The buckling process is a major driver in the connector size, because small fiber retractions cause dramatically increased space in cross-section. Finally, the optical fiber 11 causes some macrobends which results in loss of optical performance.

FIG. 8B illustrates the optical connection principle using external ferrule/fiber end face compression by applying an external force to the compress body according to the embodiments of the fiber optic connector of FIGS. 2A to 7B. FIG. 8B shows fiber optic connectors 20a, 20b, as described with reference to FIGS. 2A to 7B in a simplified manner. FIG. 8B shows only fiber optic connectors 20a, 20b with a respective ferrule body 200a, 200b to terminate respective optical fibers 11. The upper drawing of FIG. 8B shows the fiber optic connectors 20a, 20b in an unmated condition. The middle drawing shows the fiber optic connectors 20a, 20b in a first coupling state, wherein the respective end face of the ferrule bodies 200a, 200b are still not in contact. The bottom drawing of FIG. 8B shows the fiber optic connectors 20a, 20b in a mated condition in which the ferrule bodies 200a, 200b are optically coupled.

In contrast to the optical connection principle of FIG. 8A using spring-loaded ferrules, according to the ferrule/fiber end face compression mechanism illustrated in FIG. 8B, the optical fibers 11 are arranged in a (pre-)buckled state inside the fiber optic connectors 20a, 20b, before the fiber optic connectors 20a, 20b are optically coupled. In the mated condition, the external force applied to the outer surface of the respective compress body of the fiber optic connectors 20a, 20b has the effect that the ferrule bodies 200a, 200b are moved forward. As shown in the bottom drawing of FIG. 8B, the buckling of the optical fibers 20a, 20b is reduced in the mated condition. Possible macrobends only exist in the uncritical unmated state, as illustrated in the upper and the middle drawing of FIG. 8B.

Under ideal conditions, i.e. without tolerances, it would be sufficient to place the end faces of the ferrule bodies 200a, 200b to each other and apply compression force in a static mating condition in which no fiber length changes are required to achieve a physical optical connection. But due to tolerances in the system, a fiber length compensating condition is required. Therefore, the (pre-)buckled fiber principle creates the fiber buckling with possible macrobends before the mating condition. In the mated condition the buckling of the optical fibers 20a and 20b is reduced to a minimum so that macrobends are nearly avoided to keep the optical performance. Moreover, the (pre-)buckled fiber principle in combination with the ferrule/fiber end face compression mechanism in static condition allow to reduce the size of the fiber optic connectors.

The ferrule/fiber end face compression principle illustrated in FIG. 8B is used by the fiber optic connector 20 shown in FIGS. 2A to 7B. This means that in the connectorized state of the fiber optic connector 20 in which the fiber optic connector 20 is connected to the optical cable 10, the optical fiber 11 is arranged in a buckled shape in the hollow area 310 of the compress body 300 or inside the support tube 400, at least when the external force is not applied to the outer surface 303 of the compress body 300. On the other hand, in the connectorized state of the fiber optic connector 20 in which the fiber optic connector 20 is connected to the optical cable 10, the optical fiber 11 is arranged in the hollow area 310 or inside the support tube 400 in a less buckled or straight shape, when the external force is applied to the outer surface 303 of the compress body 300, because the ferrule body 200 is moved in the forward direction under the influence of the external force applied to the outer surface of the compress body.

The limitation of bringing the ferrule bodies of the fiber optic connectors 20 in the mating position and applying the compression force afterwards requires a compression source form outside of the connector design. The external force may be applied to the compress body 300 of the fiber optic connector 20 by a clamping element of a receptacle, for example an adaptor, in which the fiber optic connector 20 is inserted to be optically coupled to another fiber optic connector.

Figure 9:
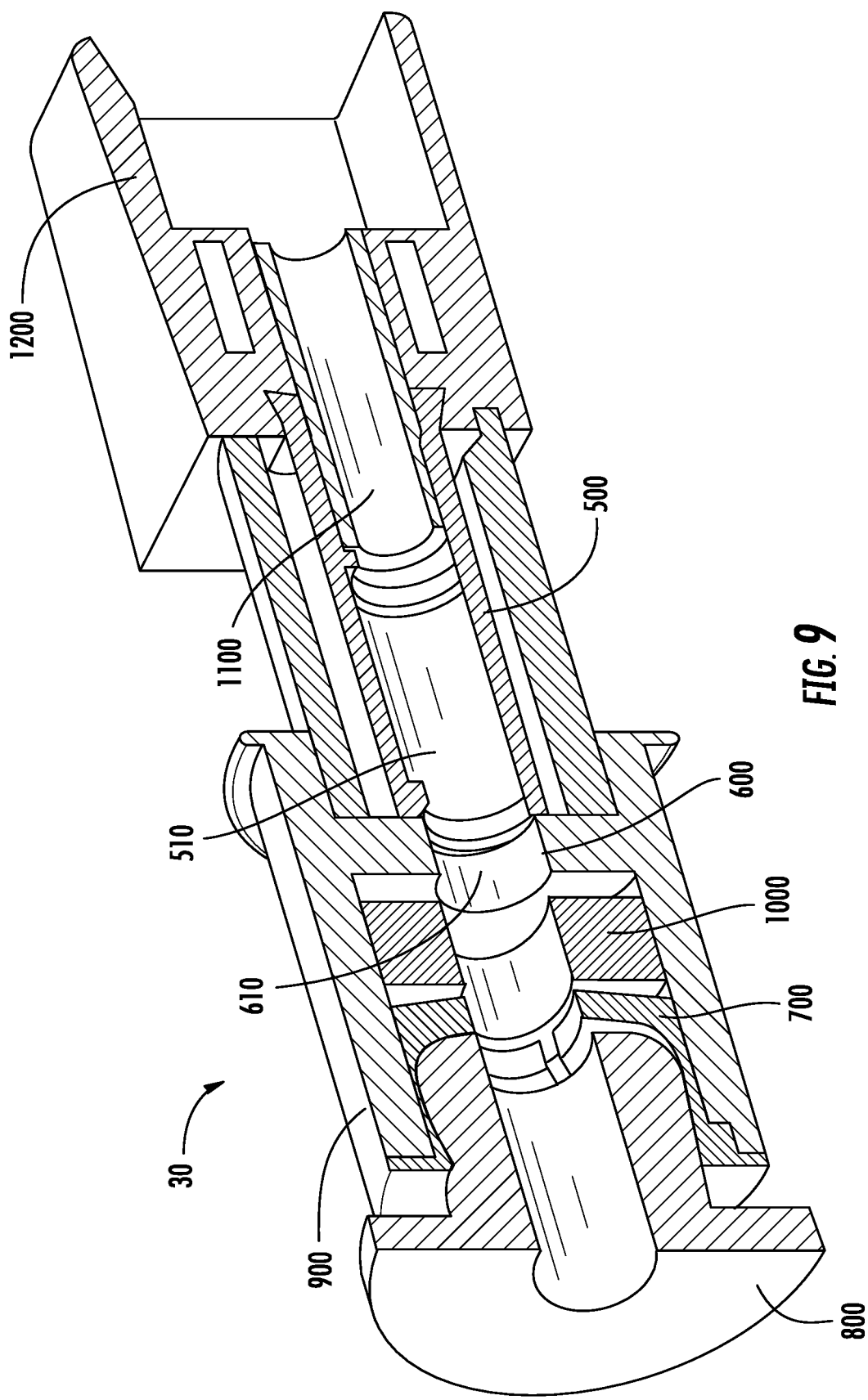
FIG. 9 shows a perspective cross-sectional view of a receptacle being configured as an optical port to receive a fiber optic connector.
Figure 10:
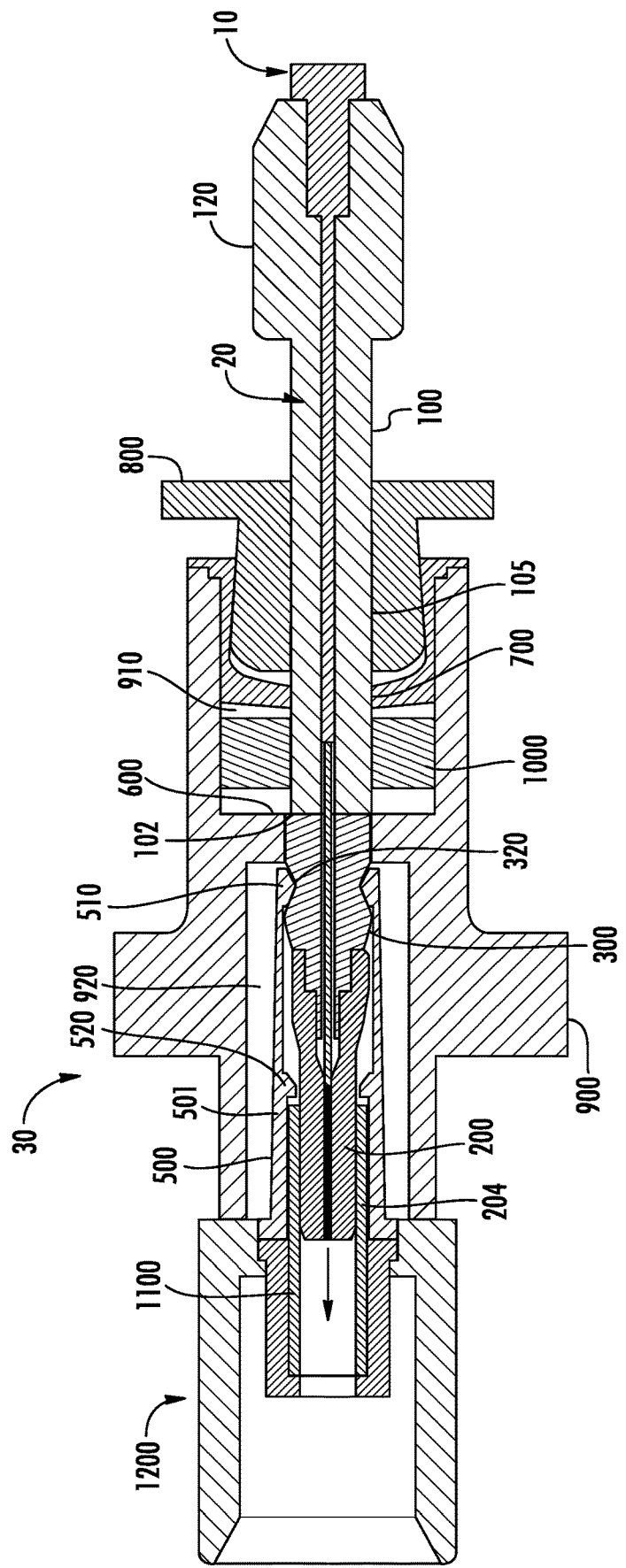
FIG. 10 shows a cross-section of an embodiment of the receptacle with a fiber optic connector secured in the receptacle.

FIG. 9 shows a perspective cross-sectional view of a receptacle 30 to receive the fiber optic connector 20, for example a hardened fiber optic connector. FIG. 10 illustrates a cross-sectional view of the receptacle 30 with the fiber optic connector 20 inserted in the receptacle. The receptacle 30 is configured as a snap-in port, for example a port for closures, to provide a snap-in connection between the port and the fiber optic connector 20 which may be configured as a snap-in connector. According to the embodiment shown in FIG. 9, the receptacle 30 provides an interface for an SC-type connector in the inside of a structure, for example, a closure.

According to the embodiment of the receptacle 30 to receive the fiber optic connector 20, the receptacle 30 comprises a securing body 500 to secure the fiber optic connector 20 to the receptacle 30. The securing body 500 comprises at least an engagement element 510 to engage the compress body 300 of the fiber optic connector 20 to secure the fiber optic connector 20 to the receptacle 30. The securing body 500 is configured as a hollow tube for inserting the ferrule body 200 and the compress body 300 of the fiber optic connector 20.

The engagement element 510 may be configured as multiple spring arms to compress the compress body 300 of the fiber optic connector so that the ferrule body 200 is moved forward as shown in FIG. 10 by the arrow. The front portion 204 of the ferrule body 200 is inserted in a sleeve 1100 of the receptacle. A right portion of the sleeve 1100 is inserted in a front portion 501 of the securing body 500. The insertion of the sleeve 1100 in the front portion 501 of the securing body 500 is limited by an abutment element 520 protruding in the tube of the securing body 500. The front portion of the sleeve 1100 is arranged in an SC adaptor 1200. Other types of adaptors, for example ST, LC, FC, and MU-style adaptors 1200, may also be used.

The receptacle 30 comprises a stopper element 600 to stop the insertion of the fiber optic connector 20 in the receptacle 30. The stopper element 600 has a hole 610 to insert the ferrule body 200 and the compress body 300 of the fiber optic connector 20. The hole 610 of the stopper element 600 has a diameter being smaller than the diameter of the connector body 100 of the fiber optic connector 20 so that the end 102 of the connector body 100 abuts on the stopper element 600, and the insertion of the fiber optic connector 20 inside the receptacle 30 is limited.

A housing 900 of the receptacle 30 comprises a cavity 910 and a cavity 920. The cavity 920 is configured to receive the securing body 500. The receptacle 30 comprises a sealing element 1000, a clamping element 700 and a release button 800. The sealing element 1000, the clamping element 700 and the release button 800 are arranged in the cavity 910 of the housing 900 of the receptacle 30.

Figure 11:
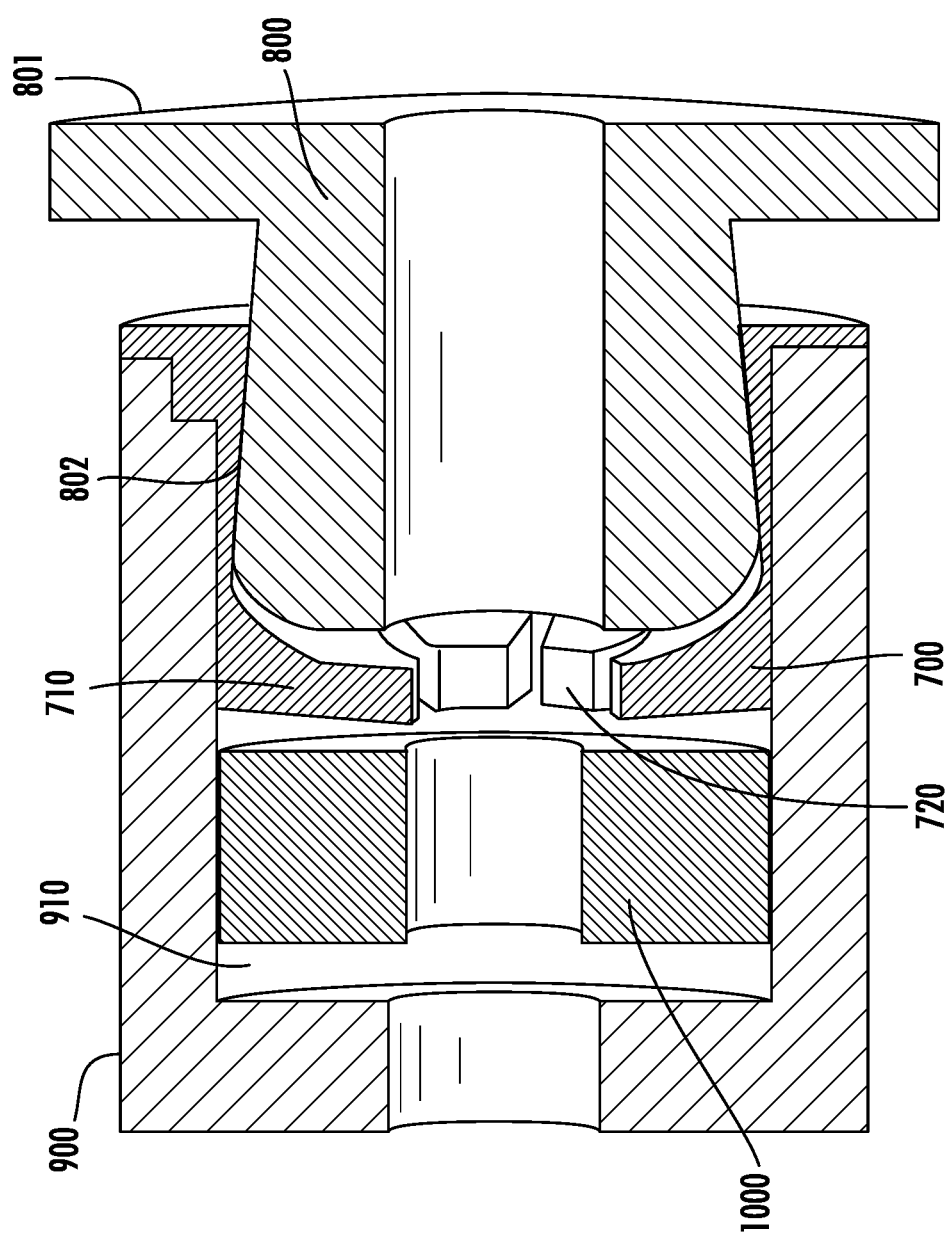
FIG. 11 shows a cross-section of a portion of a receptacle comprising a clamping element and a release button.

FIG. 11 shows an enlarged view of the cavity 910 of the housing 900 in which the clamping element 700, the release button 800 and the sealing element 1000 are arranged. The clamping element 700 has flexible clamping arms 710. The clamping arms 710 are arranged to provide an opening 720 between ends of the clamping arm 710. The opening 720 is configured to receive the connector body 100 of the fiber optic connector 20, as shown in FIG. 10. In particular, the clamping arms 710 are configured to grip in a material of the connector body 100, when the fiber optic connector 20 is inserted in the receptacle 30 and the connector body 100 is received in the opening 720 between the clamping arms 710.

The mechanical load from the cable 10 will be transferred through the connector body 100 which is grabbed by the clamping arms 710 of the receptacle 30. The clamping arms 710 may be configured as teeth, for example of a metal, which grip in the surface of the connector body 100 of the fiber optic connector. The principle works as high as a pull force of the cable, as deeper the teeth of the clamping arms 710 bite into the connector body 100. The clamping arms 710 may be made of a metal. The connector body 100 may have an elastic material which can be grabbed by the clamping arms 710.

The release button 800 is configured to disengage the fiber optic connector 20. A first portion 801 of the release body 800 protrudes out of the housing 900. A second portion 802 of the release button 800 contacts the clamping arms 710, when the first portion 801 of the release button 800 is moved towards the housing 900 and towards the clamping element 700. By using the self-supporting clamping design illustrated in FIG. 11, only the press release button 800 is able to release the clamped fiber optic connector 20. The second portion 802 of the release button 800 releases the clamping arms 710 from the connector body 100 of the fiber optic connector 20 to disengage the fiber optic connector 20 and the receptacle 30, when the first portion 801 of the release button 800 is moved towards the clamping element 700.

Referring to FIGS. 2A, 2B and 10, the cylindrically-shaped portion 120 of the connector body 100 enables the handling of the fiber optic connector 20 for installation, i.e. insertion for mating and pulling-out for disassembling. The cylindrically-shaped portion 120 of the connector body 100 ensures a force- and sealing transition between the optical cable 10 and the fiber optic connector 20. The long front portion 105 of the connector body 100 has the advantage to compensate a bending condition from the cable by engaging the strength elements 13.

Figure 12A:
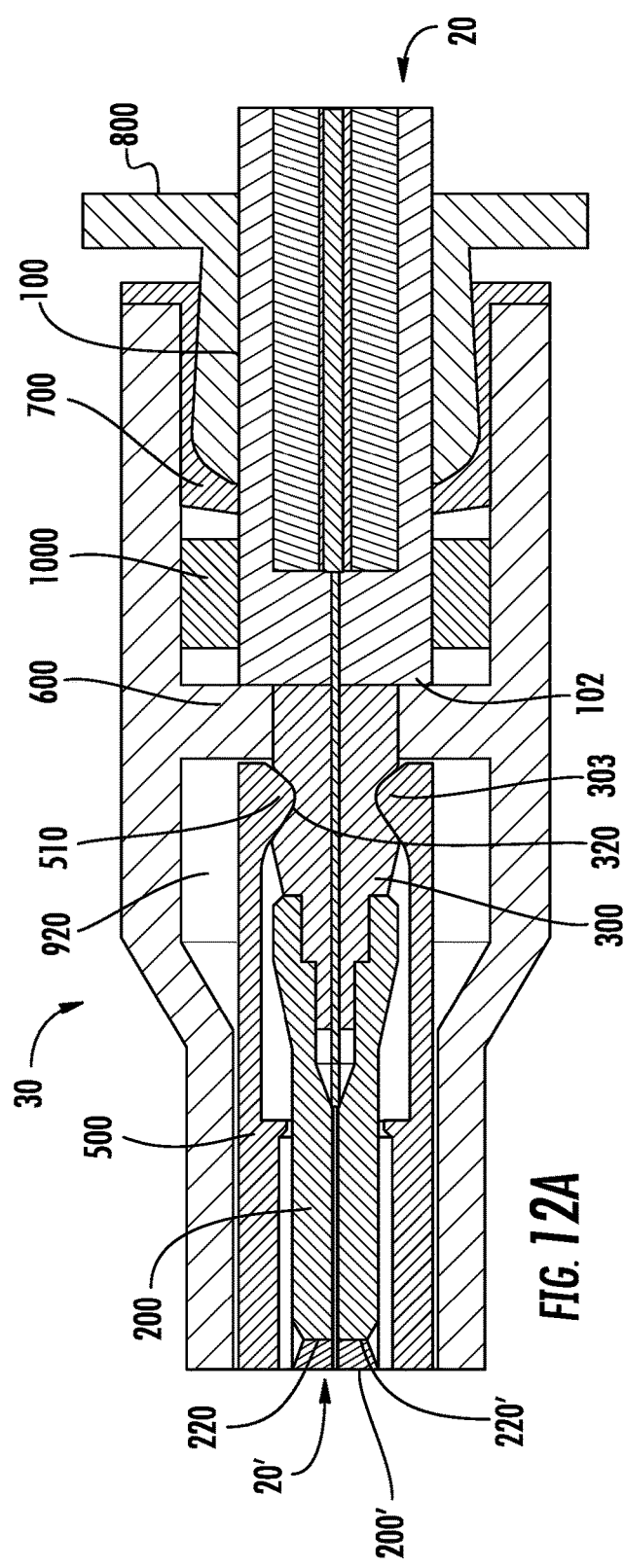
FIG. 12A shows a cross-sectional view of a receptacle configured as an inline adaptor in a mated condition with a fiber optic connector.
Figure 12B:
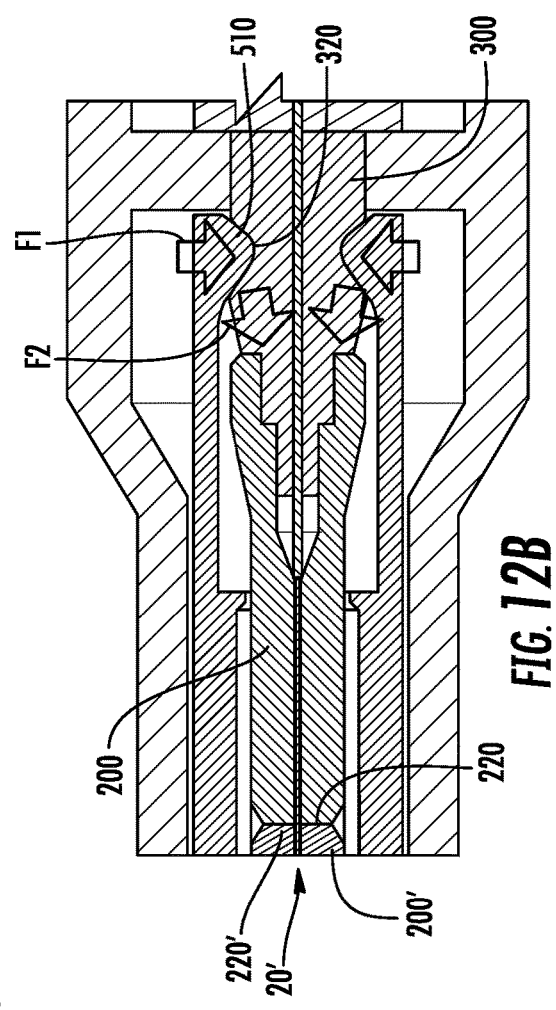
FIG. 12B shows a cross-sectional view of a receptacle providing a compression force to a ferrule body of a fiber optic connector inserted in the receptacle.

FIG. 12A shows the fiber optic connector 20 being inserted in the receptacle 30. The fiber optic connector 20 is inserted in the receptacle 30 until the end 102 of the connector body 100 abuts to the stopper element 600. The engagement element 510 of the securing body 500 engages in the notch 320 of the compress body 300 of the fiber optic connector 20. FIG. 12B illustrates an external force F1 applied by the engagement element 510 to the compress body 300 of the fiber optic connector. The external force F1 causes an internal force F2 inside the material of the compress body 300. The internal force F2 is effective on the ferrule body 200 so that the end face 220 of the ferrule body 200 is moved in a forward direction away from the connector body 100 and is pressed against an end face 220' of a ferrule body 200' of another fiber optic connector 20' to optically couple the fiber optic connector 20 to the other fiber optic connector 20'. FIGS. 12A and 12B only show a small portion of the other fiber optic connector 20'.

The material of the compress body 300 is configured such that the compress body 300 exerts the internal force F2 to the ferrule body 200, when the external force F1 is applied to the compress body 300 in a direction perpendicular to the longitudinal direction of the fiber optic connector 20. As illustrated in FIG. 12B, the material of the compress body 300 is configured to deflect the external force F2 from the direction perpendicular to the longitudinal direction of the fiber optic connector 20 towards the ferrule body 200. The material of the compress body 300 may be configured such that the compress body 300 exerts the internal force F2 to the ferrule body 200, when the external force F1 is applied to the notch 320 of the compress body 300.

The outer surface 303 of the compress body 300 has a curved design to interfere with the engagement element 510 as a counterpart in the receptacle 30. To compensate tolerance in the connection system, the elastic body 300 can move the ferrule body 200 relative to the connector body 100. The engagement element 510 may comprise multiple spring arms which work towards the connector center, i.e. the center of the compress body 300 to compress the compress body 300 in a homogenous manner from all sides.

Referring to FIGS. 7A and 7B, the compress body 300 for the multiple fiber connector shown in FIGS. 7A and 7B is designed to be compressed only from the top and bottom side instead of the actual symmetric for single fiber ferrules, as shown, for example, in FIG. 2A, 2B, 4, 12A or 12B.

The cavity 920 of the housing 900 of the receptacle 30 provides space at the engagement element/spring arms 510 to allow its elongation, when the fiber optic connector 20 is inserted in the receptacle 30. The engagement element 510 has a shape which reduces the cross-section of the tubular structure of the securing body 500 for receiving the fiber optic connector 20. If the fiber optic connector 20 slides in position, it bends the engagement element 510 apart. In the mated condition, the protruding end section of the engagement element 510 reduces the cross-section to cause the compress body 300 to be pressed. Due to the contour of the compress body 300, the ferrule body 200 can be pressed with different forces depending on the position to the spring arm ends.

Adjusting the compression force is one of the big advantages of the fiber optic connector 20 using the ferrule/fiber end face compression mechanism compared to coil spring behaviour of a conventional fiber optic connector using spring-loaded ferrules. The ferrule/fiber end face compression principle allows to decrease the ferrule compression force, if the optical cable 10 is pushed into the connection and the other way around. No coil spring can compensate loads from the cable. With a compress body-spring arm principle, new opportunities to load compensation from the cable, for example bending, are possible.

In the mated condition, the compressed body 300 is locked in the cavity/notch 320 which allows it to apply the compression force only in the direction of the ferrule body 200. Due to the (pre-)buckling of the optical fiber inside the fiber optic connector the ferrule body 200 can move forward and can compensate for tolerances and load condition.

Figure 13A:
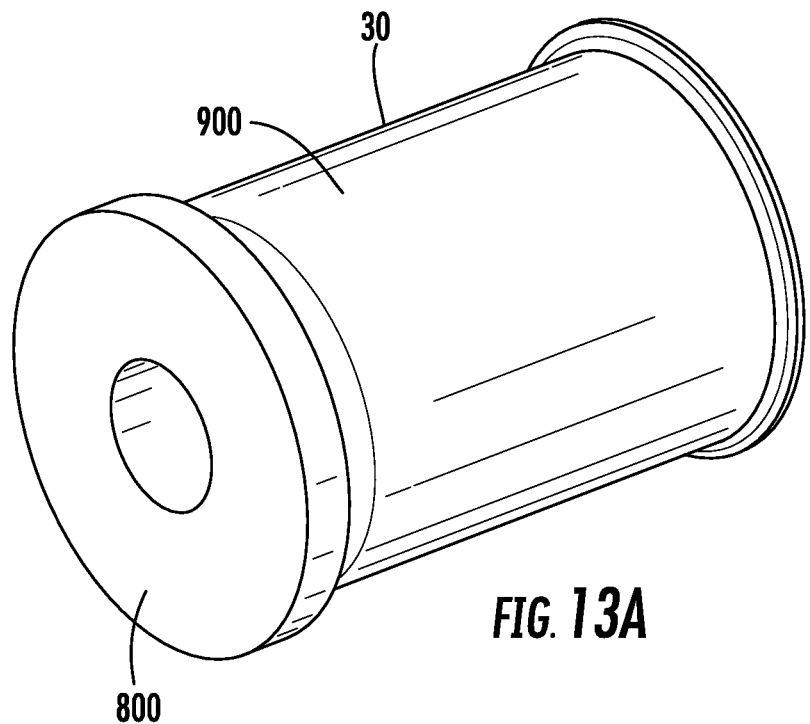
FIGS. 13A and 13B show front views to a port to receive a fiber optic connector.
Figure 13B:
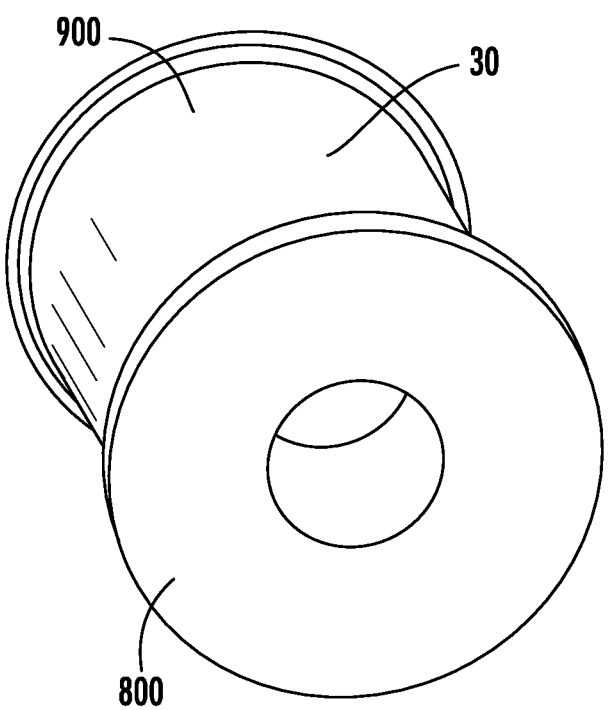

To ensure the correct locking position of the fiber optic connector 20 in the receptacle 30 the fiber optic connector and the receptacle may have a mechanical reference. FIGS. 13A and 13B show the receptacle 30 being configured as a port that protrudes out of a closure. An opening in the release button 800 may have a flattened surface which can be used as a mechanical reference to insert the fiber optic connector 20 in the right orientation.

Figure 14A:
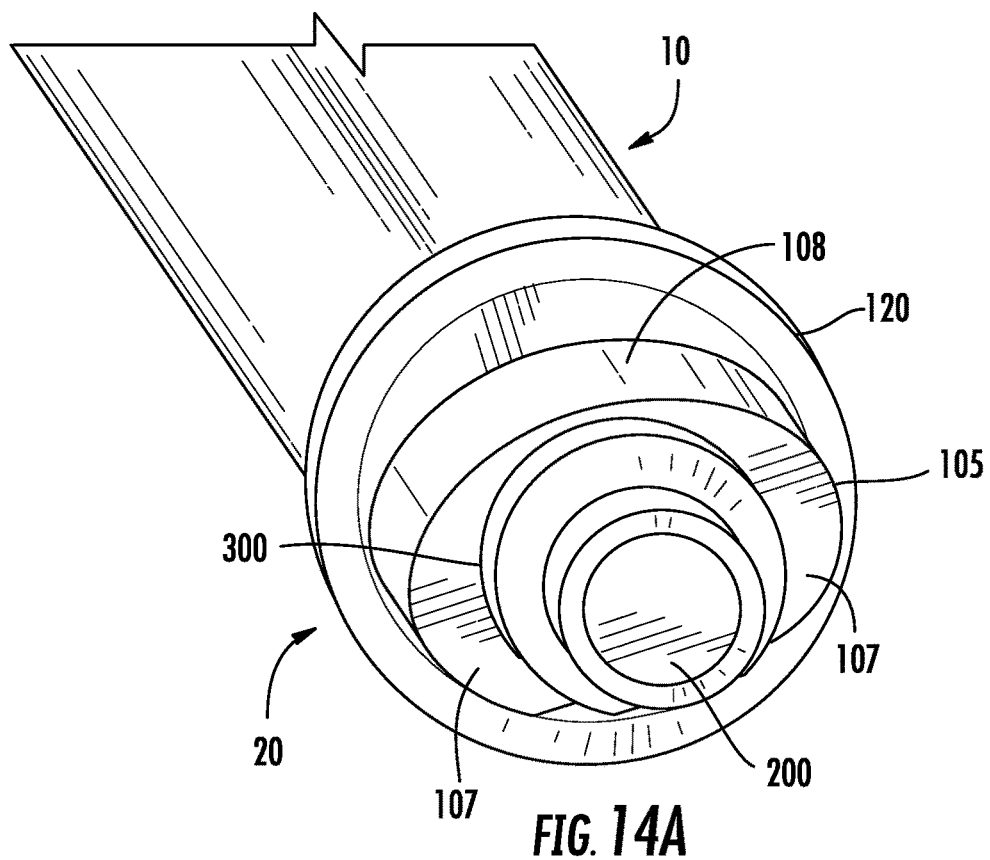
FIGS. 14A and 14B show an embodiment of a fiber optic connector with a coding to ensure the insertion of the fiber optic connector to the receptacle in the right direction.
Figure 14B:
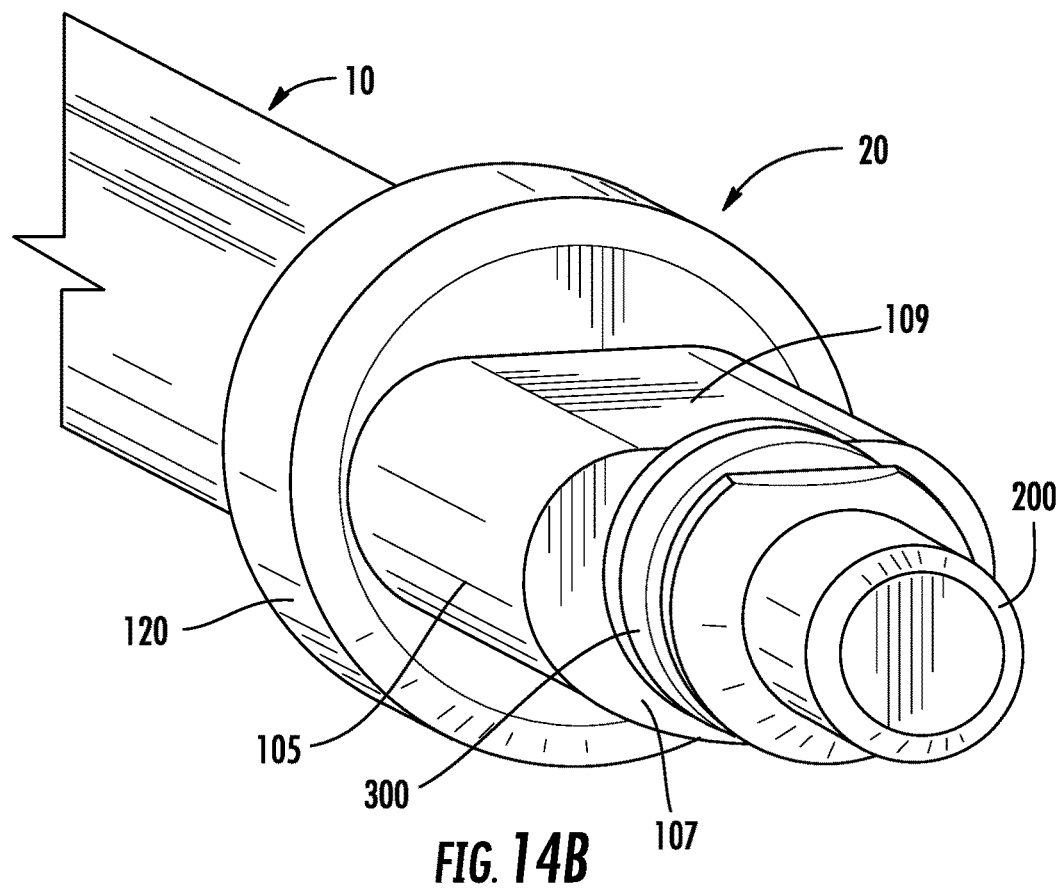

FIGS. 14A and 14B show an embodiment of a fiber optic connector 20 with a coding to facilitate the insertion of the fiber optic connector 20 in the receptacle 30. According to the embodiment of the fiber optic connector 20 illustrated in FIGS. 14A and 14B, the coding may be provided at a shoulder 107 of the front portion 105 of the connector body 100. FIG. 14A shows a top surface of the front portion 105 of the connector body 100 having a curved surface 108, whereas the bottom surface of the front portion 105 of the connector body 100 has a flattened surface 109. The connector body 100 may provide the shoulder 107 in a D-shape. The D-shape allows to connect single mode fibers with angled end faces (APC) in correct orientation. Additionally it compensates for torsion applied from the cable.

To control the insertion of the fiber optic connector 20, the connector body 100 provides the shoulders 107 for a defined stop. When the fiber optic connector 20 is inserted in the receptacle 30, the stopper element 600 of the receptacle 30 shown, for example, in FIG. 10 provides the mechanical reference/abutment for the fiber optic connector inside the receptacle to avoid a deeper insertion of the fiber optic connector in the receptacle.

The cylindrically-shaped portion 120 of the connector body 100 may provide additional indication of the correct insertion. Additional markings on the surface of the front portion 105 of the connector body 100 can be foreseen relatively to the release button. Additionally that could indicate the correct position to the operator.

Figure 15A:
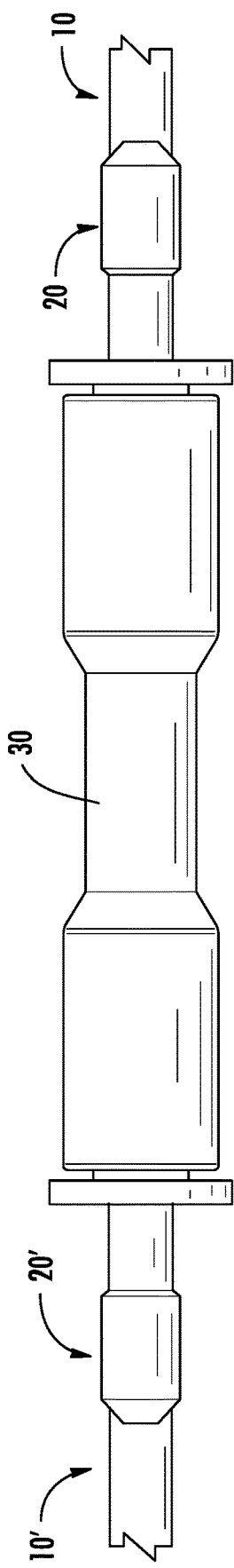
FIG. 15A shows the connection of fiber optic connectors by a receptacle configured as an inline adaptor.
Figure 15B:
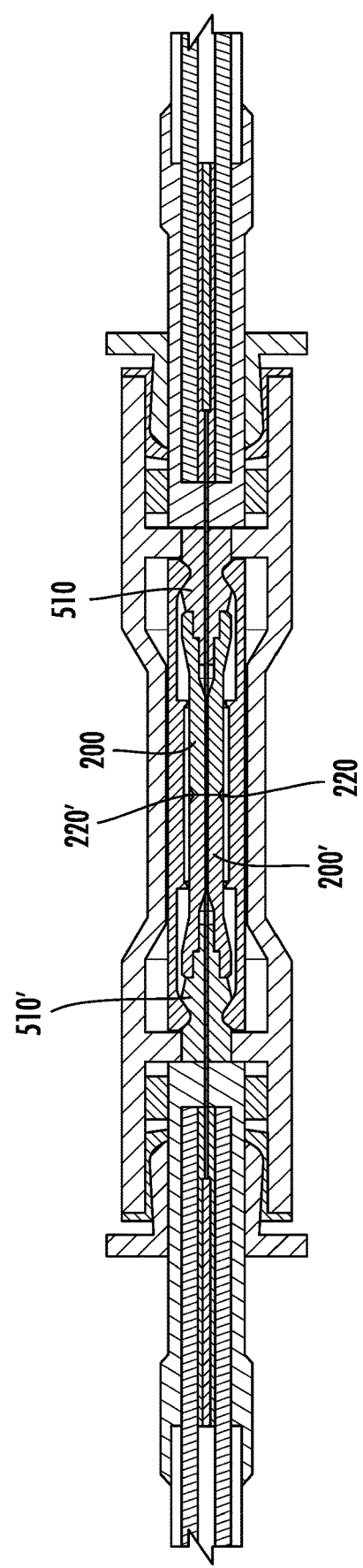
FIG. 15B shows a cross-sectional view of a connection of fiber optic connectors by a receptacle configured as an inline adaptor.

FIGS. 15A and 15B show the optical coupling of an optical cable 10 connectorized by the fiber optic connector 20 and an optical cable 10' connectorized by the fiber optic connector 20'. The fiber optic connectors are embodied as described above with reference to FIGS. 2A to 6. The ferrule bodies of the fiber optic connector 20, 20' are optically coupled inside the receptacle 30. The receptacle 30 is configured as an inline adaptor. The hardened design of the fiber optic connectors 20, 20' and the receptacle 30 allows to mate two fiber optic connectors 20, 20', being configured as snap-in connectors, together in the field.

FIG. 15B shows a cross-section of the optical coupling between the optical cables 10 and 10' inside the receptacle 30 by means of the fiber optic connectors 20 and 20'. The end faces 220, 220' of the ferrule bodies 200, 200' of the fiber optic connectors 20, 20' are optically coupled inside the receptacle 300. The ferrule/fiber end face compression is achieved by a respective compression force applied to the compression bodies 300, 300' of the fiber optic connectors 20, 20' by the engagement elements 510, 510' of the receptacle 30.

Figure 15C:
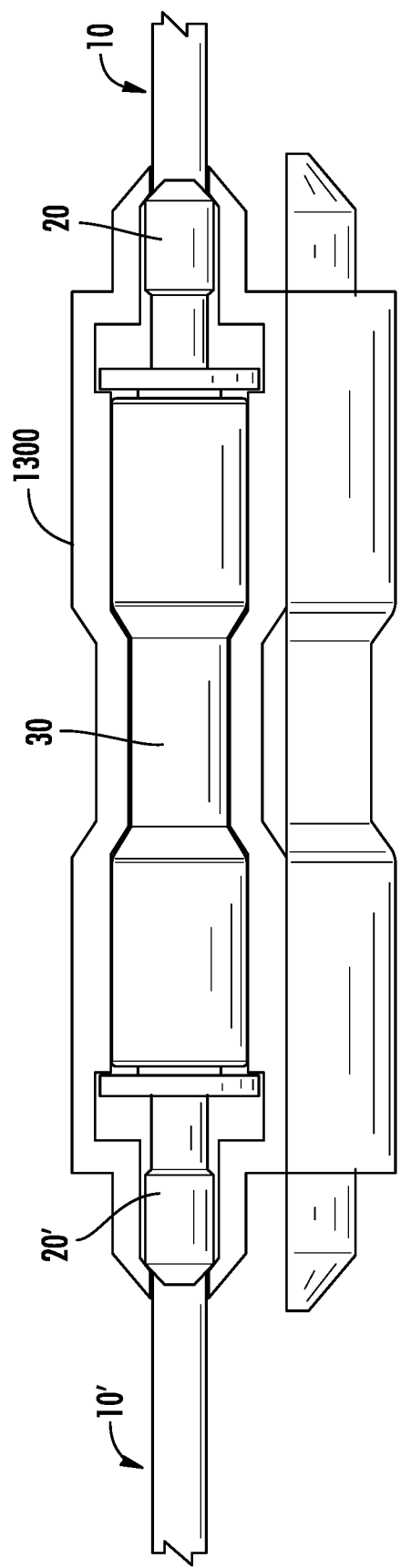
FIG. 15C shows a protection housing to house an inline adaptor for connecting fiber optic connectors.

Referring to FIG. 15C, a mechanical housing 1300 may be provided to house the receptacle 30 as well as the fiber optic connector 20 connectorizing the optical cable 10 and the fiber optic connector 20' connectorizing the optical cable 10'. The mechanical housing 1300 increases the protection, in particular the strain relief and sealing, of the inline connection of the optical cables 10 and 10'. The mechanical housing 1300 may further improve mechanical performance, for example bending. It can be used for a locking connection against access.

Figure 16A:
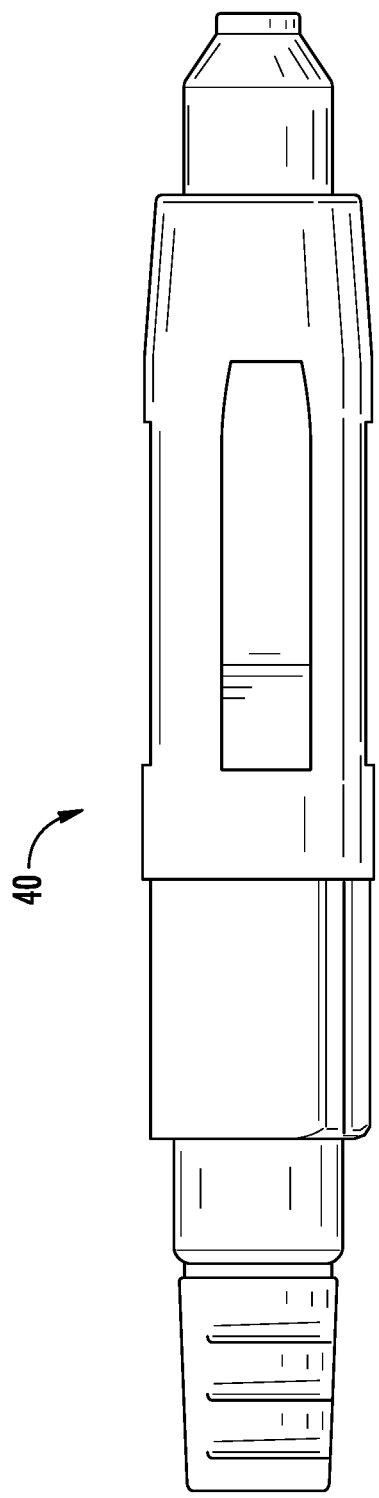
FIG. 16A shows an embodiment of a conventional fiber optic connector for connectorization of an optical fiber.
Figure 16B:
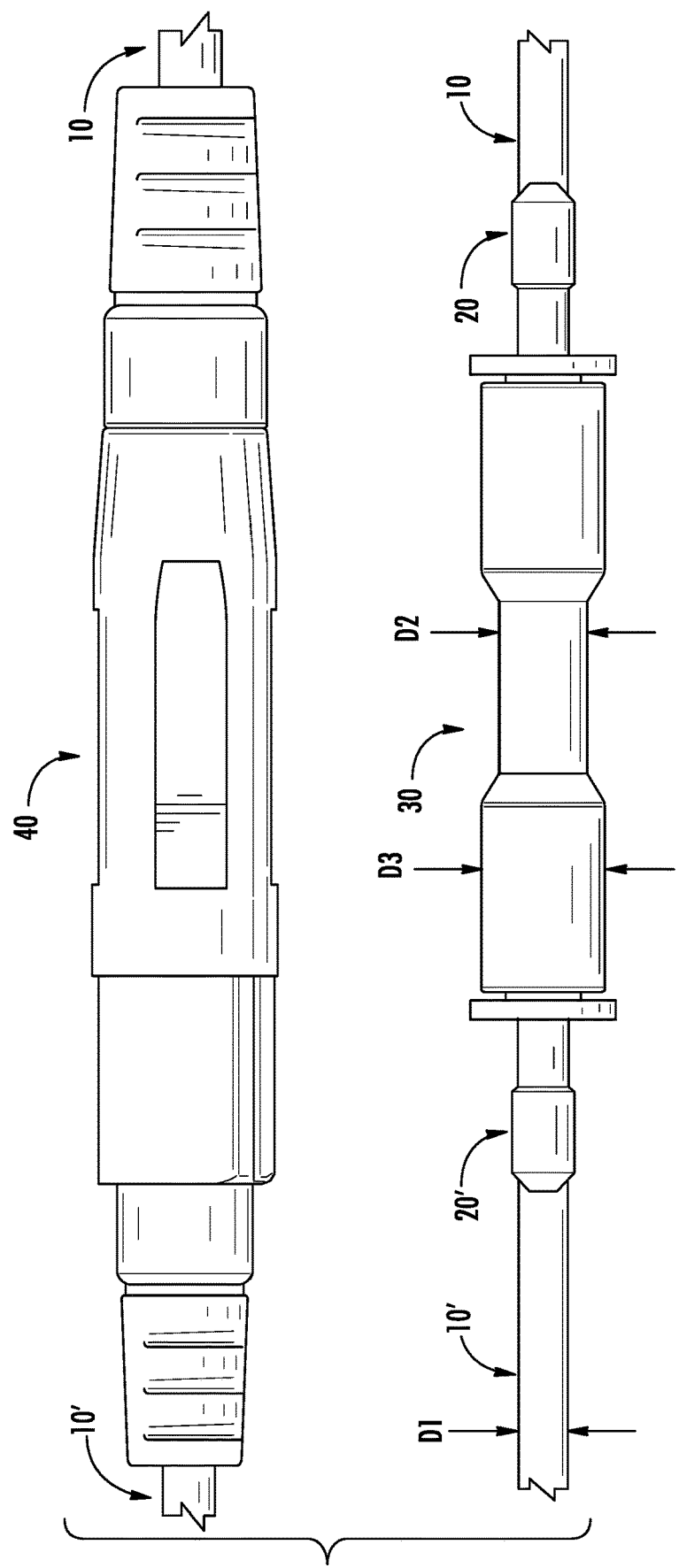
FIG. 16B illustrates a size comparison of a connection of optical cables terminated by a conventional embodiment of fiber optic connectors and an improved embodiment of fiber optic connectors.

FIG. 16A shows a conventional fiber optic connector 40. FIG. 16B illustrates a comparison between an optical coupling of optical cables 10, 10' using the conventional fiber optic connector 40 and the optical coupling of optical cables 10, 10' being coupled by the fiber optic connectors 20, 20' inside the receptacle 30. The receptacle 30 is configured as an inline adaptor. As illustrated in FIG. 16B, the small size of the whole assembly of the connection of the fiber optic connectors 20 and 20' is remarkable in comparison to the conventional Inline solution for a hardened fiber optic connection.

In comparison to spring-loaded ferrules used by the conventional fiber optic connector 40, the respective compress body of the fiber optic connectors 20 and 20' can be much smaller in the total design to hold the respective ferrule body. The size of fiber optic connectors 20, 20' is slightly bigger than the biggest diameter of the cable 10, 10'. The optical cable may have a diameter D1 of 5.4 mm. The receptacle 30 may have a diameter D2 at the smallest position of just 4.2 mm and a diameter D3 at the largest position of only 7 mm.

Figure 17A:
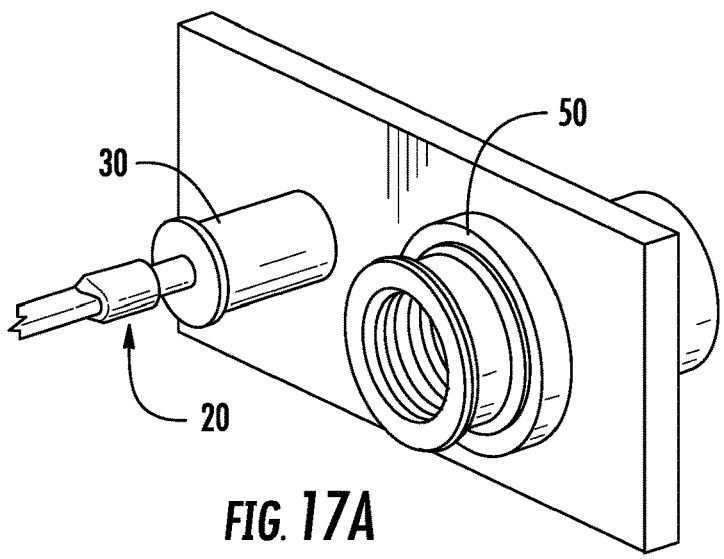
FIGS. 17A, 17B and 17C illustrate a size comparison for a conventional embodiment of a receptacle and an improved embodiment of a receptacle for wall throughputs.
Figure 17B:
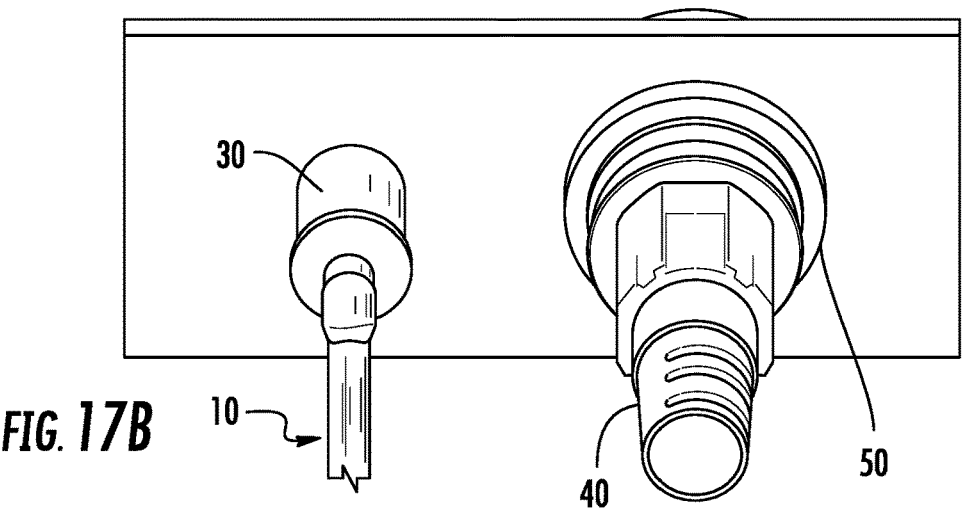
Figure 17C:
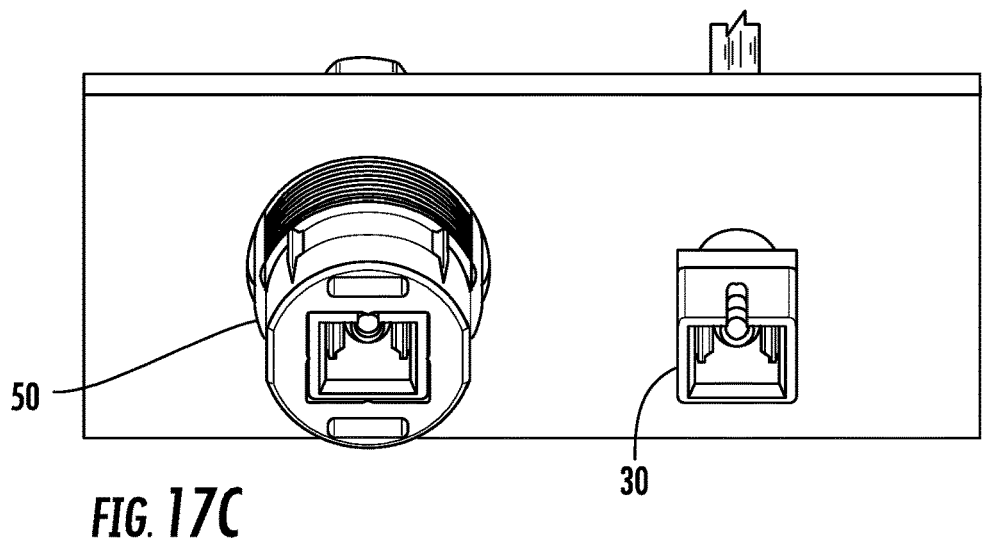

FIGS. 17A, 17B and 17C illustrate a comparison between ports in a wall of a closure using a conventional receptacle 50 to insert the conventional fiber optic connector 40 and the receptacle 30 to insert the fiber optic connector 20. When compared to the conventional port 50, the size of the receptacle 30 is smaller and allows a higher density for multiple connection.

The invention claimed is:

1. A fiber optic connector, comprising:
   a connector body comprising a first end to receive the optical cable and a second end;
   a ferrule body comprising a passageway, the passageway extending from a first end of the ferrule body to a second end of the ferrule body, the second end of the ferrule body having an end face;
   a compress body being arranged between the second end of the connector body and the first end of the ferrule body, wherein the compress body has a hollow area, and the compress body is configured to exert a force to the ferrule body so that the end face of the ferrule body is moved in a forward direction away from the connector body, when an external force is applied to an outer surface of the compress body.

2. The fiber optic connector of claim 1, wherein the hollow area of the compress body extends in a longitudinal direction of the fiber optic connector from a first end of the compress body proximal to the connector body and distal to the ferrule body to a second end of the compress body distal to the connector body and proximal to the ferrule body, and
   the material of the compress body is configured such that the compress body exerts the force to the ferrule body, when the external force is applied to the compress body in a direction perpendicular to a longitudinal direction of the fiber optic connector.

3. The fiber optic connector of claim 1, wherein the material of the compress body is configured to deflect the external force from the direction perpendicular to the longitudinal direction of the fiber optic connector towards the ferrule body.

4. The fiber optic connector of claim 1, wherein an outer surface of the compress body comprises a notch, and the material of the compress body is configured such that the compress body exerts the force to the ferrule body, when the external force is applied to the notch of the compress body.

5. The fiber optic connector of claim 1, wherein the fiber optic connector is attached to fiber optic cable comprising an optical fiber.

6. The fiber optic connector of claim 5, wherein the hollow area of the compress body comprises a diameter so that the optical fiber is arranged in a buckled shape in the hollow area of the compress body at least when the external force is not applied to the outer surface of the compress body.

7. The fiber optic connector of claim 5, wherein the connector body comprises an end section being proximal to the second end of the connector body and distal to the first end of the connector body, and the end section of the connector body comprises a hollow space, and the optical fiber is arranged in the buckled shape in the hollow space of the connector body at least when the external force is not applied to the outer surface of the compress body.

8. The fiber optic connector of claim 5, wherein the passageway of the ferrule body comprises a first portion being proximal to the second end of the ferrule body and distal to the first end of the ferrule body and a second portion being proximal to the first end of the ferrule body and distal to the second end of the ferrule body, and the first portion of the passageway of the ferrule body has a larger diameter than the second portion of the passageway of the ferrule body; and
   wherein, the optical fiber is arranged in the buckled shape in the second portion of the passageway of the ferrule body at least when the external force is not applied to the outer surface of the compress body.

9. The fiber optic connector of claim 6, further comprising a support tube being arranged at least in the hollow area of the compress body, and
   wherein, in the connectorized state of the fiber optic connector, the optical fiber is arranged in the buckled shape in the support tube at least when the external force is not applied to the outer surface of the compress body.

10. The fiber optic connector of claim 9, wherein a first section of the support tube is arranged in the second portion of the passageway of the ferrule body, and a second section of the support tube is arranged in the hollow area of the compress body.

11. The fiber optic connector of claim 10, wherein a third section of the support tube is arranged in the end section of the connector body.

12. The fiber optic connector of claim 9, wherein the optical fiber is arranged in the support tube in a less buckled shape, when the external force is applied to the outer surface of the compress body and the ferrule body is moved in the forward direction, in comparison to a state of the fiber optic connector in which the external force is not applied to the outer surface of the compress body.

13. A receptacle to receive the fiber optic connector of claim 1, comprising:
   a securing body to secure the fiber optic connector to the receptacle,
   wherein the securing body comprises at least an engagement element to engage to the compress body of the fiber optic connector to secure the fiber optic connector to the receptacle,
   wherein the at least one engagement element is configured to provide the external force to the outer surface of the compress body of the fiber optic connector so that the end face of the ferrule body of the fiber optic connector is moved in the forward direction away from the connector body of the fiber optic connector.

14. The receptacle of claim 13, further comprising:
a stopper element for stopping the insertion of the fiber optic connector in the receptacle, wherein the stopper element comprises a hole to insert the compress body and the ferrule body of the fiber optic connector, and the hole of the stopper element has a diameter being smaller than the diameter of the connector body of the fiber optic connector.

15. The receptacle of claim 13, further comprising a clamping element comprising flexible clamping arms, the clamping arms being arranged to provide an opening between ends of the clamping arms to receive the connector body of the fiber optic connector, and the clamping arms are configured to grip in a material of the connector body, when the fiber optic connector is inserted in the receptacle and the connector body is received in the opening between the clamping arms.

16. The receptacle of claim 15, comprising:
a release button to disengage the fiber optic connector;
a housing to house the clamping element and the release button,
wherein a first portion of the release button protrudes out of the housing, and a second portion of the release button contacts the clamping arms, when the first portion of the release button is moved towards the housing; and
wherein the second portion of the release button releases the clamping arms from the connector body of the fiber optic connector to disengage the receptacle and the fiber optic connector.

17. The fiber optic connector of claim 1, wherein the compress body is made of a silicon gel.

18. The fiber optic connector of claim 1, wherein compress body is made of a material having a honeycombed cellular structure.

19. The fiber optic connector of claim 4, wherein the outer surface of the compress body further comprises a front portion such that a diameter of the front portion increases from a bottom of the notch.

20. The fiber optic connector of claim 19, wherein the outer surface of the compress body further comprises a cylindrically-shaped portion and a transition portion between the notch and the cylindrically-shaped portion.

* * * * *